(12) United States Patent
Wirola et al.

(10) Patent No.: US 8,816,908 B2
(45) Date of Patent: Aug. 26, 2014

(54) OPTIMAL STORAGE SCHEME FOR ACCESS POINT COVERAGE DATA

(75) Inventors: Lauri Aarne Johannes Wirola, Tampere (FI); Tommi Antero Laine, Tampere (FI); Matti Samuli Raitoharju, Tampere (FI); Niilo Torsten Sirola, Tampere (FI)

(73) Assignee: Nokia Corporation, Espoo (FI)

( * ) Notice: Subject to any disclaimer, the term of this patent is extended or adjusted under 35 U.S.C. 154(b) by 208 days.

(21) Appl. No.: 13/202,609

(22) PCT Filed: Mar. 4, 2009

(86) PCT No.: PCT/US2009/001433
§ 371 (c)(1),
(2), (4) Date: Aug. 22, 2011

(87) PCT Pub. No.: WO2010/101552
PCT Pub. Date: Sep. 10, 2010

(65) Prior Publication Data
US 2012/0139790 A1 Jun. 7, 2012

(51) Int. Cl.
*G01S 1/00* (2006.01)
*G01S 1/08* (2006.01)

(52) U.S. Cl.
USPC .......................................... 342/385; 342/386

(58) Field of Classification Search
USPC .............. 342/385, 386, 450, 451; 455/456.1, 455/456.6
See application file for complete search history.

(56) References Cited

U.S. PATENT DOCUMENTS

| | | | |
|---|---|---|---|
| 6,952,181 B2 | 10/2005 | Karr et al. | |
| 7,072,666 B1* | 7/2006 | Kullman et al. | 455/456.1 |
| 8,285,303 B2* | 10/2012 | Imae | 455/456.1 |
| 2008/0188256 A1 | 8/2008 | Wu et al. | |
| 2009/0017831 A1 | 1/2009 | Wigren | |
| 2010/0099433 A1* | 4/2010 | Wigren | 455/456.1 |
| 2010/0302953 A1* | 12/2010 | Li | 370/252 |
| 2011/0250905 A1* | 10/2011 | Wigren | 455/456.1 |

OTHER PUBLICATIONS

Notification of Transmittal of International Search Report and Written Opinion (2 pages), International Search Report dated May 18, 2009 in International Patent Application No. PCT/US2009/01433 (3 pages) and Written Opinion (8 pages) (13 pages total).
U.S. Appl. No. 13/202,603, filed Aug. 22, 2011, Lauri Wirola.
U.S. Appl. No. 13/202,591, filed Aug. 22, 2011, Lauri Wirola.
U.S. Appl. No. 13/202,595, filed Aug. 22, 2011, Lauri Wirola.
U.S. Appl. No. 13/254,271, filed Sep. 1, 2011, Lauri Wirola.
Puhakka, A., "Computer Graphics", Technical University of Tampere/Institute of Software Systems, 2006, pp. 1-575.
Barber, C.B., et al., "The Quickhull Algorithm for Convex Hulls", ACM Transactions on Mathematical Software, vol. 22, No. 4, Dec. 1996, pp. 469-483.
Khachiyan, L.G., "Rounding of Polytopes in the Real Number Model of Computation", Mathematics of Operations Research, vol. 21. No. 2, May 1996, pp. 307-320.

(Continued)

*Primary Examiner* — Dao Phan
(74) *Attorney, Agent, or Firm* — Locke Lord LLP

(57) ABSTRACT

It is disclosed to determine, as a representation of a set of terminal positions, a polygon that encloses all terminal positions of the set of terminal positions. The terminal positions are positions of one or more terminals within a coverage area of a communication node.

19 Claims, 11 Drawing Sheets

(56) References Cited

OTHER PUBLICATIONS

Computational Geometry Algorithms Library (Cgal), http://www.cgal.org, 2 pages, downloaded Feb. 8, 2013.

Gartner, B., et al., "Smallest Enclosing Ellipses—An Exact and Generic Implementation in C++", technical report Freie Universitat Berlin, http://www.inf.fu-berlin.de/inst/pubs/tr-b-98-05.abstract.html, Apr. 1998, pp. 1-150.

* cited by examiner

OPTIMAL STORAGE SCHEME FOR ACCESS POINT COVERAGE DATA

THE NAMES OF THE PARTIES TO A JOINT RESEARCH AGREEMENT

The claimed invention was made by or on behalf of Tampere University of Tampere, Finland and Nokia Corporation of Espoo, Finland as parties to a joint research agreement that was in effect on or before the date the claimed invention was made.

FIELD

This invention relates to representing a set of terminal positions.

BACKGROUND

As an alternative or add-on to satellite-based positioning systems, positioning systems in which a present position of a terminal is estimated based on a list of communication nodes (for instance cellular base stations, access points or beacons) that can presently be heard by the terminal and a database that contains identifiers and positions of the communication nodes and/or models for the coverage areas for a number of communication nodes have gained recent interest.

For instance, given that the heard communication node positions are known and distances from the terminal to the heard communication nodes can be estimated, the terminal's position can be estimated through triangulation. The distance between a terminal and the heard communication nodes can for instance be estimated based on the path loss using a channel model (i.e. how much the signal attenuates between the terminal and the communication node) or based on timing (or round-trip timing) measurements (i.e. information expressing how long signals propagate between terminal and communication node).

Alternatively, if models for the communication node coverage areas are known, then a terminal may pick the coverage areas for the heard communication nodes and find the intersection of these coverage areas. The terminal can then be assigned a position that is, for instance, the center-of-mass of the intersection area. Similarly an error estimate for the position estimate can be given, for example, based on the size of the intersection.

A model for the coverage area of a communication node can for instance be determined by having one or more terminals that are capable of determining their position report their present position as well as a list of communication nodes that can presently be heard, gathering, for each communication node, the terminal positions reported into a set of terminal positions and deriving, from this set of terminal positions, a model for the coverage area of the communication node.

SUMMARY OF SOME EXEMPLARY EMBODIMENTS OF THE INVENTION

Since the number of terminal positions in sets of terminal positions can get particularly large depending on the number of reporting terminals and the reporting frequency, and since these sets of terminal positions may be continuously updated with further terminal positions, a suited representation of the sets of terminal positions is required that for instance lends itself to storage and handling.

According to a first aspect of the present invention, a method is disclosed, comprising determining, as a representation of a set of terminal positions, a polygon that encloses all terminal positions of the set of terminal positions, wherein the terminal positions are positions of one or more terminals within a coverage area of a communication node.

According to a second aspect of the present invention, further an apparatus is disclosed, comprising a processor configured to determine, as a representation of a set of terminal positions, a polygon that encloses all terminal positions of the set of terminal positions, wherein the terminal positions are positions of one or more terminals within a coverage area of a communication node.

The processor may for instance be implemented in hardware alone, may have certain aspects in software alone, or may be a combination of hardware and software. An exemplary embodiment of the processor may comprise a memory, wherein instructions executed by the processor may be transferrable to the memory and/or contained in the memory. Said memory may for instance store a program according to the fourth aspect of the present invention described below, or at least parts thereof.

According to a third aspect of the present invention, furthermore an apparatus is disclosed, comprising means for determining, as a representation of a set of terminal positions, a polygon that encloses all terminal positions of the set of terminal positions, wherein the terminal positions are positions of one or more terminals within a coverage area of a communication node. An example for the means for determining a polygon is a processor configured to determine the polygon, but the means is not limited thereto.

The apparatuses according to the second and third aspect of the present invention may for instance be a server or a part thereof. They may for instance further comprise a memory, IP connectivity and/or a user interface.

According to a fourth aspect of the present invention, further a program is disclosed, comprising program code for performing the method according to the first aspect of the present invention and all exemplary embodiments thereof, when the program is executed on a processor.

The program may for instance be distributed via a network, such as for instance the Internet. The program may for instance be stored or encoded on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device. The readable medium may for instance be a tangible medium, for instance a tangible storage medium.

According to the present invention, the communication node may for instance be a communication node of a communication system. It may then for instance provide coverage for one or more terminals. The communication system may be a wireless or a wire-bound communication system, and may be of cellular or non-cellular type. The communication node may for instance be a one-directional or bi-directional communication node. Non-limiting examples of the communication node as understood in this specification are thus a cellular base station, a Wireless Local Area Network (WLAN) access point, a Bluetooth station, an FM radio station, and a TV station. The communication node may be fixed or mobile, for instance with low mobility and/or velocity. In case of sectorization of cells, each sector may also be understood as a communication node given that sectors have unique identification codes, even if all sectors are controlled by the same (cellular) base station.

The communication node has a coverage area, which may be understood as an area within which terminals are able to receive signals sent from the communication node at least with a pre-determined minimum quality, wherein the quality may for instance be expressed in terms of signal strength or signal-to-noise-ratio, to name but a few examples. In case of a wireless communication node, the coverage area may for instance depend on the transmission frequency and the propagation environment, which may for instance cause shadowing. The coverage area does not necessarily have to be continuous, it may equally well have recesses and may equally well consist of several sub-areas.

The one or more terminals may be fixed or mobile terminals that are at least capable of receiving signals sent by the communication node in order to be able to determine if they are within a coverage area of the communication node.

The terminal positions are positions of one or more terminals within the coverage area. This may be understood to require that a terminal position is the current position of a terminal at a time instant when the terminal is determined to be within the coverage area.

The terminal positions may for instance be reported by the one or more terminals together with an identification of the communication node and optionally further parameters, for instance a timestamp, a Received Signal Strength (RSS), path loss, a range indication with respect to the communication node (for instance based on a Timing Advance (TA) or Round Trip Delay (RTD)), to name but a few examples. The terminal positions may for instance be reported as so-called fingerprints, which comprise the position of the terminal and a list of the communication nodes in the coverage area of which the terminal is determined to be, i.e. a list of the communication nodes that can be heard by the terminal, and optionally further parameters as indicated above. Such a fingerprint thus provides a terminal position for several communication nodes at a time. Equally well, a fingerprint may contain a batch of positions and associated communication node identifications, for instance gathered during a certain amount of time. It may also be the case that the terminal positions are derived from one or more fingerprints that only contain a list of the communication nodes heard by a terminal. The position reported by the terminal may, in rare cases, also be a position outside the coverage area, in particular when the measurement of the position by the terminal is erroneous.

Therein, a terminal may for instance be considered to "hear" a communication node if it is able to receive one or more signals, which are sent by the communication node, with a pre-defined minimum quality, wherein said quality may for instance be defined in terms of a signal-to-noise ratio or a signal-to-noise and interference ratio. An example of such a signal sent by a communication node may for instance be a broadcast channel. As an alternative, said terminal may for instance be considered to be "hear" a communication node if the terminal is capable of at least partially receiving and correctly decoding one or more signals sent by the communication node, such as a broadcast channel. The terminal may for instance be considered to "hear" a communication node if the terminal is able to receive and correctly decode a communication node identifier (for instance a Medium Access Control (MAC) address or another identifier). The information which communication nodes a terminal can hear may for instance result from a scanning/sniffing operation performed by the terminal.

The set of terminal positions may for instance be at least temporarily and at least partially be stored in a database, optionally with associated parameters as indicated above (timestamps, RSS, TA, RTD, etc.). The terminal positions and the further optional parameters may for instance be reported to the database or to a pre-processing/pre-filtering instance associated with the database from the one or more terminals as fingerprints, for instance if the one or more terminals are capable of determining the terminal positions by themselves (e.g. via a satellite-based positioning system), or if the terminal positions are otherwise made available to the one or more terminals (for instance by user input, or by an apparatus that determines the terminal positions and provides them to the one or more terminals. Not all terminal positions and their optionally associated parameters reported to the database or to the pre-processing/pre-filtering instance may be stored, some of them may be discarded and then do not form part of the set of terminal positions. Said set of terminal positions may also only be a subset of a superset of terminal positions, for instance said set of terminal positions may be obtained from said superset of terminal positions by excluding terminal positions that are considered as potential outliers with respect to the coverage area and/or by excluding terminal positions that are monitored, i.e. considered to be potential outliers or to be potentially outdated.

As a representation of the set of terminals, a polygon that encloses all terminal positions of the set of terminal positions is determined. Therein, terminal positions are also considered to be enclosed by the polygon if they form vertices of the polygon or are positioned on the segments connecting two vertices of the polygon. The number of vertices of the polygon may be fixed (for instance pre-defined) or variable, it may for instance depend on the spatial distribution of the terminal positions in the set of terminal positions and/or may be adjusted (for instance dynamically) to control an amount of storage space required to store the vertices of the polygon and/or to control a resolution of the polygon. The form of the polygon may be adaptive to the terminal positions in the set of terminal positions, it may in particular be a not pre-defined form and may not be a pre-defined rectangular or a pre-defined hexagonal form.

The polygon may for instance be a convex polygon. The polygon may for instance represent, parameterize or form the convex hull for all terminal positions in the set of terminal positions. Equally well, the polygon, for a desired (e.g. pre-defined, for instance maximum) number of vertices, may be the smallest convex area containing all terminal positions of the set of terminal positions.

Representing the set of terminals by a polygon allows reducing the amount of data that has to be stored to represent the set of terminal positions (and thus to represent the coverage area), since, instead of having to store all terminal positions of the set of terminal positions, only a representation of the polygon, for instance only the vertices of the polygon, have to be stored to represent the coverage area. Moreover, the vertices may be represented relative to a selected reference point, such as a particular vertex. This further reduces the space requirements. If the terminal positions are reported together with further optional parameters (such as for instance timestamps, RSS, TA, RTD and range parameters, etc.), then only the parameters associated with the terminal positions forming vertices of the polygon may be stored.

The polygon may still contain enough information on the coverage area of the communication node to allow deriving other models for the coverage area of the communication node. If the models are for instance elliptical or rectangular models, derivation of these models from the polygon may be particularly easy. The models may for instance define geometrical shapes that represent the coverage area, either as a hard boundary, or as a soft statistical boundary. In the former case, the geometrical shape then represents the outer boundary of the coverage area, whereas in the latter case, the geometrical shape may not necessarily represent the outer boundary of the coverage area. For instance, if the model is based on the assumption that terminals are distributed in the coverage according to a 2D Gaussian distribution, the geometrical shape, for instance an ellipse, may for instance define the 1σ, 2σ or 3σ area (with σ denoting the standard deviation) in which 39%, 86% or 99% of the terminal positions are considered to be within, respectively. Such models (for instance their parameters and optional further parameters) may (optionally together with corresponding models for coverage areas of further communication nodes) for instance be provided to one or more terminals for fingerprint-based positioning, i.e. for positioning in which a position of a terminal is determined based on a list of communication nodes heard by the terminal and on coverage area models of the communication nodes, or to allow to derive pre-models for the coverage area of the communication node that may be used by a pre-processing/pre-filtering instance to determine which terminal positions are actually stored in a database for further processing by an instance that generates the models, or to allow estimating a position of the communication node, to name but a few examples.

Furthermore, a polygon may be a flexible and fully scalable representation of the set of terminal positions with respect to resolution. For instance, if the polygon is determined to represent the convex hull for all terminal positions in the set of terminal positions, the number of vertices of the convex polygon represents the resolution and adapts automatically to the resolution of the set of terminal positions. Nevertheless, this resolution may be controlled, for instance by prescribing a maximum number of vertices to be used by the polygon, and merging adjacent vertices of the polygon to arrive at the prescribed maximum number. The new vertices generated by this merging may then have to fulfill the condition that an area of the polygon increases by the merging as minimally as possible. Moreover, if it is required that the polygon is a convex one then naturally the new vertices must preserve this property. In the case a new vertex is generated based on two adjacent vertices, the new vertex is generally no longer a terminal position reported by a physical terminal. However, in this specification the definition of terminal position may at least incidentally also be understood to include also such computational terminal positions.

Representing the set of terminal positions by a polygon may also allow easy consideration of new terminal positions, since the polygon may easily be amended to incorporate the new terminal positions. In contrast, when using for instance elliptical models to represent the sets of terminal positions, since these elliptical models are a type of lossy packing for the original data, updating the elliptical model to incorporate new terminal positions in an optimal way may be problematic, if not even impossible.

Using a polygon as a representation of the set of terminals furthermore may allow to easily import other models for the coverage area of the communication node, for instance from another database, for instance by converting the models into terminal positions and then treating these terminal positions like the terminal positions that are actually reported by the one or more terminals.

Using a polygon as a representation of the set of terminals furthermore may allow simply adding new terminal positions (that are for instance derived from reported fingerprints) as new vertices of the polygon and removing redundant points later (to obtain a convex polygon enclosing all points). This may for instance be advantageous in the time critical initial phase of collecting terminal positions, since the terminal positions may then arrive quickly and in large numbers.

An apparatus that performs the determining of the polygon (i.e. the apparatuses according to the second and third aspect of the present invention) may for instance be part of the same apparatus that (at least temporarily and at least partially) stores the set of terminal positions, such as for instance a server. Alternatively, the apparatus that performs the determining of the polygon and an apparatus that (at least temporarily and at least partially) stores the set of terminal positions are not part of the same apparatus.

According to an exemplary embodiment of all aspects of the present invention, the polygon represents a convex hull for the set of terminal positions or is derived from the convex hull by merging at least two adjacent vertices of the convex hull. The polygon may for instance equal a convex hull for the set of terminal positions. The convex hull defines the smallest convex area containing all the terminal positions of the set of terminal positions. For representing the convex hull, only its vertices may have to be stored. Merging of vertices of the convex hull may for instance be required to reduce the number of vertices of the convex hull, and may cause a slight increase in the area of the resulting polygon as compared to the area of the convex hull before the merging.

According to an exemplary embodiment of all aspects of the present invention, the set of terminal positions is obtained from a unit, and the vertices of the polygon are outputted to the unit or another unit. According to this exemplary embodiment, the apparatus according to the second aspect of the present invention comprises an interface configured to obtain the set of terminal positions from the unit, and an interface configured to output the vertices of the polygon to the unit or another unit. According to this exemplary embodiment, the apparatus according to the third aspect of the present invention comprises means for obtaining the set of terminal positions from the unit, and means for outputting the vertices of the polygon to the unit or another unit. Examples for the means for obtaining and for outputting are interfaces, but the means are not limited thereto.

The unit may for instance be a database, in which the set of terminal positions is at least temporarily and at least partially stored. The terminal positions may for instance stem from fingerprints (containing a terminal position and a list of communication nodes that can presently be heard by the terminal) that are reported by the one or more terminals and are reported to the database or to a pre-processing/pre-filtering unit that filters the fingerprints before forwarding them to the database.

After obtaining the set of terminal positions from the unit, the polygon is determined for the set of terminal positions, and the vertices of the polygon are outputted to the unit or another unit. The vertices of the polygon may for instance be intended to replace the set of terminal positions obtained from the unit, since it represents the coverage area of the communication node with reduced storage requirements.

If the terminal positions are associated with further parameters (such as timestamps, RSS, TA, RTD, etc.), these parameters may be obtained from the unit together with the terminal positions, and may also be outputted together with the vertices of the polygon.

In this exemplary embodiment of the present invention, the unit from which the set of terminal positions is obtained and a unit that performs the determining of the polygon (i.e. the apparatuses according to the second and third aspect of the present invention) may thus for instance be different components within one apparatus, like for instance a server, or may be components of two different apparatuses, respectively.

According to an exemplary embodiment of all aspects of the present invention, the set of terminal positions comprises an old set of terminal positions and at least one new terminal position. The set of terminal positions thus may be understood to be updated in regular or irregular intervals with the at least one new terminal position.

Therein, the method according to the first aspect of the present invention may comprise obtaining the vertices of the old polygon and the at least one new terminal position from a unit, and outputting the vertices of the polygon to the unit or another unit. Correspondingly, the apparatus according to the second aspect of the present invention may comprise an interface configured to obtain the vertices of the old polygon and the at least one new terminal position from a unit, and an interface configured to output the vertices of the polygon to the unit or another unit. Correspondingly, the apparatus according to the third aspect of the present invention may comprise means for obtaining the vertices of the old polygon and the at least one new terminal position from a unit, and means for outputting the vertices of the polygon to the unit or another unit. Examples for the means for obtaining and for outputting are interfaces, but the means are not limited thereto.

If the vertices of the old polygon and the new terminal positions are associated with further parameters (such as timestamps, RSS, TA, RTD, etc.), these parameters may be obtained from the unit together with the terminal positions, and may also be outputted together with the vertices of the polygon.

Therein, the polygon may for instance be determined under consideration of an old polygon, which encloses all terminal positions of the old set of terminal positions, and the at least one new terminal position. The old set of terminal positions may for instance be an initial set of terminal positions, i.e. the old polygon is determined as a representation of the coverage area of the communication node for the first time.

Therein, the old polygon may for instance equal a convex hull for the old set of terminal positions or may be derived from the convex hull by merging at least two adjacent vertices of the convex hull.

Therein, the polygon may for instance be determined as the convex hull of a set of positions that comprises the vertices of the old polygon and the at least one new terminal position, or is derived from the convex hull by merging at least two adjacent vertices of the convex hull.

Therein, the polygon may for instance be determined by updating the old polygon with the at least one further terminal position.

According to an exemplary embodiment of all aspects of the present invention, the vertices of the polygon are stored. According to this exemplary embodiment of the present invention, the apparatus according to the second aspect of the present invention comprises a memory configured to store the vertices of the polygon. According to this exemplary embodiment of the present invention, the apparatus according to the third aspect of the present invention comprises means for storing the vertices of the polygon. The vertices of the polygon may for instance be stored as the representation of the set of terminal positions. The vertices of the polygon may for instance be stored to replace the set of terminal positions.

If the vertices are associated with further parameters (such as timestamps, RSS, TA, RTD, etc.), these parameters may be stored together with the vertices.

According to an exemplary embodiment of the first aspect of the present invention, the method further comprises deriving a model for the coverage area of the communication node from the polygon, wherein the model is to be provided to at least one terminal to allow the terminal to perform positioning based on the model. Correspondingly, the processor of the apparatus according to the second aspect of the present invention or a further processor of the apparatus is configured to derive such a model from the polygon. Correspondingly, the processor of the apparatus according to the third aspect of the present invention comprises means for deriving such a model from the polygon. The models may for instance be provided to the at least one terminal to enable the terminal to determine its position based on a list of the communication nodes currently heard and the models. This kind of positioning may complement or replace satellite-based positioning in the at least one terminal. The at least one model may for instance represent a hard boundary or a soft statistical boundary of the coverage area.

According to an exemplary embodiment of all aspects of the present invention, said polygon is a model for said coverage area of said communication node and is to be provided to at least one terminal to allow said terminal to perform positioning based on said model. The models may for instance be provided to the at least one terminal to enable the terminal to determine its position based on a list of the communication nodes currently heard and the models. This kind of positioning may complement or replace satellite-based positioning in the at least one terminal. The at least one model may for instance represent a hard boundary or a soft statistical boundary of the coverage area.

According to an exemplary embodiment of all aspects of the present invention, the set of terminal positions is obtained from a superset of terminal positions by exclusion of one or more terminal positions that are considered as potential outliers with respect to the coverage area of the communication node. An outlier may for instance occur when a terminal that is actually within the coverage area measures or reports its position erroneously. A position may be classified as a potential outlier if it is considered to be too far apart from the assumed coverage area of the communication node, for instance since it has a distance with respect to the assumed coverage area that is above a distance threshold, wherein the assumed coverage area of the communication node may for instance be represented by a model for said coverage area.

According to an exemplary embodiment of the first aspect of the present invention, the method further comprises deriving a model for the coverage area of the communication node from the polygon, wherein the model is to be provided to at least one unit that is configured to receive terminal positions reported by one or more terminals and to filter the terminal positions based on the model to at least temporarily reduce an amount of the received terminal positions, and wherein the set of terminal positions only contains such filtered terminal positions. Correspondingly, the processor of the apparatus according to the second aspect of the present invention or a further processor of said apparatus may be configured to derive the model as described in this paragraph. Correspondingly, the apparatus according to the third aspect of the present invention may comprise means for deriving a model as described in this paragraph. Said unit may for instance be a pre-processing/pre-filtering instance such as a fingerprint file reader unit.

The model may for instance be a pre-model that is used by a pre-processing/pre-filtering unit that determines which reported fingerprints (and the terminal positions contained therein) shall be discarded and which shall not be discarded and thus shall potentially contribute to the representation of the coverage area of the communication node. Said unit may only temporarily reduce the amount of the received terminal positions. The amount of filtering may for instance be based on a state of the unit. For instance, in an initial phase, all terminal positions may pass the unit, wherein in a saturated phase, only a few specific terminal positions may pass the unit. Said pre-model may for instance represent a hard boundary or a soft statistical boundary of the coverage area. Said pre-model may for instance be an elliptical or rectangular model. The pre-model may for instance be or be obtained from an ellipse that is fitted around the polygon or otherwise derived from the polygon. Equally well, the pre-model may for instance be a box fitted into said ellipse or a box fitted around said ellipse. The pre-model may have a simpler form or format than models provided to terminals to allow the terminals to perform positioning, or may allow less complex determining if a position is covered by the model (which may represent both a hard boundary or a soft statistical boundary of the coverage area).

According to an exemplary embodiment of all aspects of the present invention, the set of terminal positions is obtained from a superset of terminal positions by exclusion of one or more monitored terminal positions, and the monitored terminal positions are terminal positions that are considered to be potentially outdated and/or potential outliers with respect to the coverage area. Terminal positions may be monitored to keep the models for the coverage area of the communication node derived from the polygon up-to-date even when the coverage area changes due to, for instance, movement of the communication node and/or change of the transmission power of the communication node. If a monitored terminal position is not confirmed within a specific (for instance predefined) time interval, the terminal position may be deleted, and the polygon may be determined anew. Then also the models for the coverage area of the communication node to be provided to terminals to allow the terminals to perform position estimation and/or the pre-models used to filter fingerprints may be updated, in particular if they are derived from said polygon.

According to an exemplary embodiment of all aspects of the present invention, the number of vertices of the polygon is adjusted to control a resolution of the representation of the set of terminals and/or a storage space required for storing the vertices of the polygon. Correspondingly, the processor of the apparatus according to the second aspect of the present invention or a further processor of the apparatus is configured to adjust the number of vertices of the polygon to control a resolution of the set of terminal positions and/or a storage space required for storing the vertices of the polygon. Correspondingly, the processor of the apparatus according to the third aspect of the present invention comprises means for adjusting the number of vertices of the polygon to control a resolution of the representation of set of terminal positions and/or a storage space required for storing the vertices of the polygon. For instance, if more resolution is required, more vertices may be used, and if a shortage of storage space occurs, the number of vertices can be reduced. In situations where the number of vertices becomes too large, adjacent vertices may be merged at the cost of a slight increase in the area of the polygon.

According to an exemplary embodiment of all aspects of the present invention, a position of the communication node is estimated based on information associated with only the vertices of the polygon. Correspondingly, the processor of the apparatus according to the second aspect of the present invention or a further processor of the apparatus is configured to estimate a position of the communication node based on information associated with only the vertices of the polygon. Correspondingly, the processor of the apparatus according to the third aspect of the present invention comprises means for estimating a position of the communication node based on information associated with only the vertices of the polygon. Estimation of the position of the communication node may for instance be based on TA parameters reported by the one or more terminals together with the terminal positions (i.e. for instance in the fingerprints reported by the terminals). Since the polygon vertices may generally be spatially well-distributed, the communication node position estimate based on the vertices (and as the case may be their associated TA parameters) can be assumed to be of good quality.

It is to be noted that the above description of embodiments of the present invention is to be understood to be merely exemplary and non-limiting. Furthermore, the exemplary embodiments described above and in particular their single features shall be understood to be disclosed in all possible combinations with each other.

These and further aspects of the invention will be apparent from and elucidated with reference to the detailed description presented hereinafter.

DETAILED DESCRIPTION OF EXEMPLARY EMBODIMENTS OF THE INVENTION

Figure 1:
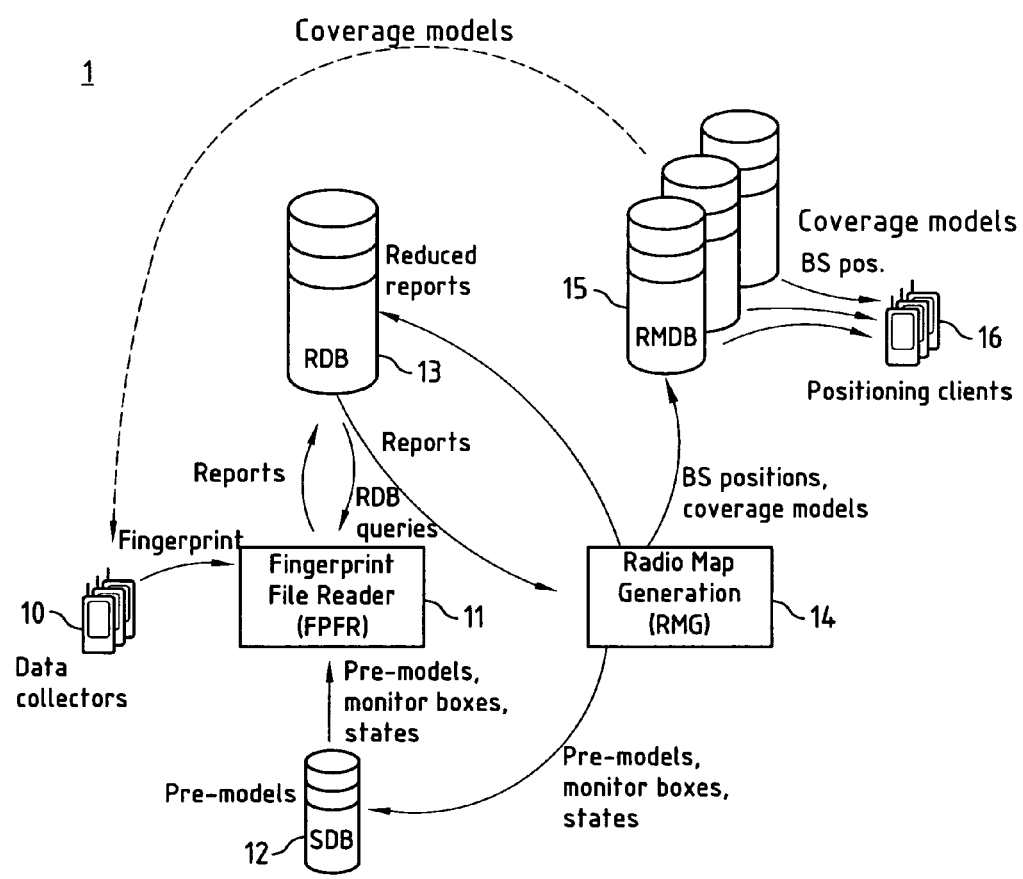
FIG. 1: A schematic block diagram of an exemplary system implementing exemplary aspects according to the present invention.

Satellite positioning does not work well indoors or in other shadowed environments. However, various communication nodes are ubiquitous in the modern world. Non-limiting examples of such communication nodes include cellular base stations, WLAN access points, FM radio or TV stations.

Instead of the term "communication node", also the term "base station" will be used in the following description, wherein the term "base station" is not necessarily understood to be restricted to a cellular base station. These base stations have good penetration and coverage virtually everywhere of interest. Since the range of these beacons may usually be relatively short (for instance hundreds of meters to some kilometers), these beacons may be exploited for positioning purposes.

For instance, WLAN-based positioning may complement Global Navigation Satellite System (GNSS) based positioning in urban environments. Typically GNSS-based positioning methods have problems in urban canyons—however, these are also areas, in which the WLAN AP density is high. WLAN-positioning also enables indoor positioning allowing for more effective Location Based Services (LBS).

WLAN Access Points (WLAN APs) can be used for positioning given that the position(s) of the AP(s) are known. In general, WLAN-based positioning assumes a database, either local (in the terminal) and/or remote (in the server) containing at least WLAN AP identification information (e.g. a WLAN AP Medium Access Control (MAC) address) and the geographical coordinates of the WLAN APs. The database may also contain an estimate of the WLAN AP position accuracy. Moreover, a coverage area may also be modeled.

The database of WLAN APs and their geographical coordinates and/or coverage models allow for positioning the terminal with WLAN. GNSS or some other conventional positioning capability may then not be required.

In positioning, the terminal performs a WLAN AP scan and then compares the scan results to the records in the database. If applicable records are found, the information is combined in some suitable manner (such as, weighted average based on Relative Signal Strength (RSS) values) to produce a position estimate for the terminal.

Therein, if the base station positions are known and distances from the terminal to the heard base stations can be estimated, the terminal's position can be estimated through triangulation. The distance between a terminal and the heard base stations can be estimated based on either the path loss (i.e. how much the signal attenuates between the terminal and the base station) using a channel model or based on timing (or round-trip timing) measurements (i.e. information expressing how long signals propagate between terminal and base station).

If models for the base station coverage areas are known, then a terminal may pick the coverage areas for the heard base stations and find the intersection of these coverage areas. The terminal can then be assigned a position that is, for instance, the center-of-mass of the intersection area. In addition the position error may be estimated by the size of the intersection.

These mechanisms may also be combined: distance measurements can be combined with coverage area models to produce a position estimate. Even satellite (GNSS) pseudorange measurements may be taken into account in these hybrid methods to obtain additional measurements.

The database for WLAN-based positioning can be built in various ways. One solution may be that a company buys hotspot directories from WLAN network providers and assimilates these directories in their databases. Alternatively, a plurality of terminals may perform the WLAN AP mapping. In such a case the terminals may have a Global Navigation Satellite System (GNSS) or Assisted GNSS (AGNSS) receiver attached to or inside the terminal and provide data on the WLAN AP's coverage. It may also be the case that the database build-up is a community-based effort. Yet another alternative is to have vehicles equipped with GNSS positioning system and WLAN scanning equipment driving along the streets and roads in order to quickly map large areas.

It is readily understood by a person skilled in the art that the techniques described above in the context of a WLAN system are equally applicable with any other radio network-technology as well. Potential candidates include Bluetooth, Wibree (Ultra Low Power Bluetooth), Global System for Mobile Communication (GSM), Wideband Code Division Multiple Access (WCDMA), Code Division Multiple Access (CDMA), Long Term Evolution (LTE), Worldwide Interoperability for Microwave Access (WiMAX), to name but a few non-limiting examples.

The above-described WLAN-based positioning may also be combined/complemented with Cell ID-based positioning. When collecting the data for the WLAN AP database, also information on 2G (second generation, e.g. GSM) and/or 3G (third generation, e.g. UMTS) cells (or on cells of any other cellular communication system) that can be observed in the present position (serving station and optionally also the neighboring stations) may be collected.

The data collected on WLAN APs and 2G/3G cells can for instance be collected on central servers and distributed to the terminals for position determination.

FIG. 1 schematically illustrates the functional blocks of an exemplary system 1 that comprises exemplary embodiments of the present invention.

The server side of the exemplary system 1 comprises two processing blocks, Finger Print (FP) File Reader (FPFR) block 11 and Radio Map Generation (RMG) block 14. Moreover, there are three data stores, Report Data Base (RRDB) 13, Screening Data Base (SDB) 12 and Radio Map Data Base (RMDB) 15. Each can be either centralized or, for example, regionally distributed. Moreover, although the exemplary architecture shows several different databases, they can be implemented as one single same database or may be broken down in more databases in different implementations. It is clear to a person skilled in the art that the actual number and naming of databases is an implementation issue and does not affect the concept disclosed in this specification. The terminals 10 acting as data collectors or positioning clients 16 can also be seen as processing blocks of system 1.

The one or more terminals (e.g. mobile terminals) 10 with positioning capacity (e.g. GPS) send a fingerprint comprising one or more positions (i.e. terminal positions, for instance the terminal's coordinates) and a list of one or more base station IDs heard at each position, and optionally further parameters such as for instance their signal strengths and/or approximate ranges. Alternatively, the position may also be obtained based on the user input for instance via user pointing the current location on the map.

The fingerprint arrives to the FPFR block 11, which splits the information into base-station-specific reports, and stores the base-station-specific reports, which, in the simplest case, are only terminal positions, into the RDB 13. FPFR block 11 may implement a filter that drops reports when they are considered to add no new information to the already collected data. To be able to deal with the massive number of incoming reports, the FPFR block 11 may for instance make use of simplified pre-models of the coverage area (stored in SDB 12) to be able to quickly drop most of the redundant reports.

The RMG block 14 reads (for instance continuously or periodically, or in response to a trigger event, such as an arrival of a new report or an accumulation of a certain amount of reports) reports from the RDB 13, and updates the coverage models (for instance elliptical models or models that are based on elliptical models) to be distributed and delivered to the positioning clients 16, and the simplified pre-models to be fed back to the FPFR block 11 performing report screening (via SDB 12). The RMG block 14 may also remove redundant reports from RDB 13, keeping only a small but representative set of reports on the coverage area of each base station.

Finally, the coverage models are delivered to terminals 16 to be used for positioning on their own or combined to other positioning data in the terminal.

The following two ellipse formats are exemplarily used in this specification:

An "axis/angle-form" ellipse, defined by coordinates of the centre in World Geodetic System (WGS-84) longitude and latitude, lengths of the semi-major and semi-minor axes (in meters, referring to WGS-84 coordinates), and orientation of the semi-major axis (degrees, clock-wise from North). Moreover, a confidence value can be included as well. If the ellipse is interpreted in a statistical sense, i.e. to represent a soft statistical boundary for the positions in the coverage area rather than a hard boundary that includes all positions in the coverage area, the confidence value may specify which area with respect to the coverage area the ellipse describes. For instance, if the positions are assumed to be statistically distributed in the coverage area according to a 2D Gaussian distribution, the confidence value may for instance express if the ellipse represents the $\sigma$, $2\sigma$ or $3\sigma$ area of the 2D Gaussian distribution, wherein a is the standard deviation. Therein, the $\sigma$, $2\sigma$ and $3\sigma$ areas may for instance be understood as the areas in which 39%, 86% and 99% of the terminal positions are considered to be within, respectively.

A "matrix-form" ellipse: coordinates (WGS-84) of the centre $c=(lat_E, lon_E)$, and three coefficients $a>0$, $d>0$, and b so that point $x=(lat, ion)$ is inside the ellipse if $$(x-c)^T A(x-c) \le 1$$

with $$A = \begin{bmatrix} a & b \\ b & d \end{bmatrix}.$$

The matrix-form ellipse may require more memory space for storage, but may be faster to manipulate than the axis/angle-form ellipse. Similar to the axis/angle-form ellipse, also the matrix-form ellipse may represent a soft statistical boundary for the positions in the coverage area rather than a hard boundary that includes all positions in the coverage area. For instance, the centre c may then be interpreted as the mean value and the matrix A may then be interpreted as the covariance matrix, for instance of a 2D Gaussian distribution assumed for the distribution of the positions in the coverage area. The ellipse may then no longer coincide with the outer boundary of the coverage area, it may rather define a sub-area of the coverage area, for instance the $\sigma$ area.

Details on conversion between the axis/angle-form ellipse and the matrix-form ellipse are given in Appendix A.6.

In the following, the processing blocks of the exemplary system 1 of FIG. 1 will be described in further detail.

The one or more terminals 10 send fingerprints. Fingerprints may for instance include available network measurements for 2G (e.g. GSM) and/or 3G (e.g. UMTS) serving and neighboring base stations as well as for WLAN base stations (access points). The network measurements for instance comprise the base station identification of the base stations heard, but may also include signal strength (Received Signal Strength, RSS) and timing measurements (such as Timing Advance, TA and/or Round Trip Delay), which may be indicative of the range to the base station. The majority of the fingerprints contain one or more estimates of the terminal's position. The fingerprints may further contain one or more timestamps.

From these fingerprints, base-station specific reports are generated by FPFR block 11, for instance in the form of Table 1.

TABLE 1

Exemplary Report Format

| Parameter | Description |
| --- | --- |
| ID | Unique ID code of the base station |
| Type | 2G/3G serving/neighbor, WLAN, WiMAX, etc. |
| Timestamp | Timestamp |
| Position | Reported position |
| RSS | Received signal strength (if available) |
| Range | Range to base station (if available) |

In the exemplary system of FIG. 1, the FPFR block 11 chooses representative reports with respect to each base station and stores them into RDB 13. Therein, it is to be noted that the base station does not necessarily have to be the primary record for storing fingerprints/reports. Equally well, the fingerprints may be stored in a database in a position-specific way, so that the according entries in the database then may pertain to several base stations. The fingerprints may of course also be stored and/or processed according to other criteria.

Fingerprints containing measurements with respect to several base stations (and optionally neighboring base stations) are split by base station and treated separately.

RDB 13 may for instance store a pre-defined number of reports with respect to each base station, and it may be targeted to use as little computation as possible to sieve the significant ones from the mass of incoming reports. If available, pre-models in SDB 12 are used in deciding which reports are interesting and which are not, wherein the pre-models may for instance be of rectangular or elliptical shape.

According to exemplary embodiments of the present invention, RMG block 14 uses a polygon, in particular a convex polygon, as a primary model for representing the terminal positions that are reported by the one or more terminals 10 (see FIG. 1) and are at least temporarily stored (in the form of reports) in RDB 13. These terminal positions reported so far may be considered to form a set of terminal positions. This polygon may for instance be based on a convex hull for this set of terminal positions or may be derived from this convex hull. The maximum number of vertices of this polygon may be limited to some pre-defined value. The coverage models and the pre-models are derived from this polygon. Algorithms for determining and updating a polygon (in particular a convex hull) are presented in Appendices A.1-A.4 below.

The reports in the RDB 13 may then be overwritten with a reduced set of reports (or unnecessary reports may be deleted), i.e. those reports that are associated with the terminal positions that form or a representative of the polygon, e.g. its vertices. Nevertheless, depending on the monitoring status of the border reports/terminal positions (e.g. the vertices of the convex hull), also interior reports/terminal positions (i.e. terminal positions within the polygon) may be stored in the RDB 13.

Figure 2:
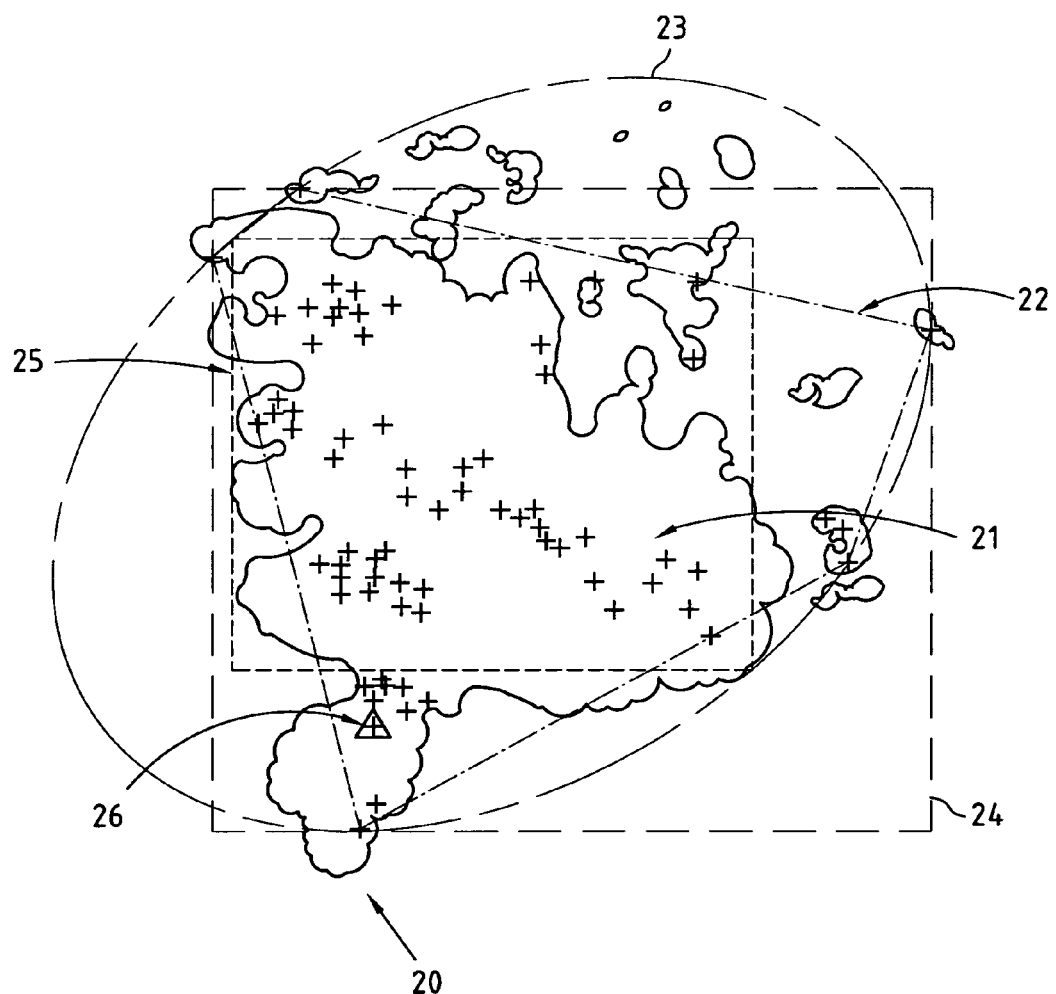
FIG. 2: a schematic illustration of an exemplary coverage area of a base station with an exemplary polygonal representation and different exemplary coverage models and pre-models according to the present invention.

An example of a convex polygon 22 (in this case a convex hull) enclosing the terminal positions 21 in a coverage area 20 of a base station 26 is given in FIG. 2.

In addition to the polygon 22 serving as a representation of the coverage area of the base station as discussed above, the RMG block 14 further generates a coverage model and different pre-models based on this polygon 22, as will be described now.

All of these models are models for the coverage area of the base station. In the following, models for the coverage area of the base station that are to be provided to the positioning terminals 16 (see FIG. 1) will be denoted as "coverage models" (e.g. the axis/angle-form ellipse (either representing a hard boundary or a soft statistical boundary) or a model that is based on the parameters of the axis/angle-form ellipse and for instance adds one or more further parameters, also either representing a hard boundary or a soft statistical boundary), whereas the models for the coverage area of the base station that are provided to FPFR 11 and stored in SDB 12 will be denoted as "pre-models" (e.g. the inner box, outer box and matrix-form ellipse models (which may also represent a hard boundary or a soft statistical boundary)).

In the following, for simplicity of presentation, it will exemplarily be assumed that the coverage models and pre-models represent hard boundaries for the positions in the coverage area.

An elliptical coverage model is generated by RMG block 14 by fitting the minimum area ellipse around the polygon 22 (see for instance ellipse 23 enclosing convex hull 22 in FIG. 2). An according iterative algorithm is presented in Appendix A.5 below. When updating this ellipse, the old ellipse may be used as the initial guess. The ellipse or a model that is based on the ellipse may then be saved in RMDB 15 (as coverage model).

Table 2 illustrates an exemplary coverage model entry (for an axis/angle form ellipse) in RMDB 15.

TABLE 2

Exemplary coverage model entry in the RMDB

| Parameter | Description |
| --- | --- |
| ID | Unique ID code of the base station |
| Type | 2G, 3G, WLAN, etc. |
| State | State from SDB |
| Position | Base station position (if available) |
| Coverage model | Coverage model, e.g. a model comprising the parameters of the axis/angle-form ellipse and optionally further parameters |

RMG block 14 further generates the following pre-models, which are stored in SDB 12 (see FIG. 2):

matrix-form ellipse 23: Minimal ellipse fitted around the polygon/convex hull 22. All reports so far are inside the ellipse 23.

outer box 24: Formed around ellipse 23 from minimum and maximum coordinates. All reports so far are inside the outer box 24.

inner box 25: Maximal box fitted inside the outer ellipse 23. Reports inside the inner box 25 do not change the current ellipse.

Table 3 illustrates an exemplary entry in SDB 12.

TABLE 3

Exemplary SDB entry

| Parameter | Description |
| --- | --- |
| ID | Unique ID code of the base station |
| timestamp | time when pre-models were last modified |

TABLE 3-continued

Exemplary SDB entry

| Parameter | Description |
| --- | --- |
| Type | 2G, 3G, WLAN, etc. |
| State | State of the state machine |
| monitorBox | monitoring boxes |
| monitorExp | monitoring expiry timestamps |
| InnerBox | Pre-model (min/max/lat/lon) |
| OuterBox | Pre-model (min/max/lat/lon) |
| Ellipse | Pre-model (matrix-form ellipse) |

The different pre-models stored in SDB 12 are utilized based on a state of a state machine that is associated with a coverage area of a base station (this state machine may equally well be considered to be associated with the process of generating/updating models for the coverage area of a base station and/or with the one or more models generated/updated by said process). The states of the state machine will—for the sake of simplicity of presentation—frequently be referred to as states of the coverage area in the following.

An exemplary embodiment of the screening process in FPFR block 11 (see FIG. 1), which uses the pre-models described above, is given in FIG. 3. Incoming fingerprints are first split into individual (base-station-specific) reports (or converted into individual reports in case of incoming coverage models), see step 500. If the report is within a monitor box (step 501), which will be explained in further detail below, the monitor box is removed (step 508), the timestamp of the monitored report is updated (step 508), and the report is stored in RDB 13 (step 509). Otherwise, a processing according to the state of the coverage area is executed (see step 502).

Exemplary states are:

1. BURN-IN: Store all reports in the RDB 13. This is used for new coverage areas and those coverage areas that gather very little traffic.
2. COLLECTING: Drop reports inside the inner box 25 (see FIG. 2), which may be about 50%-90% of the incoming data (see steps 506 and 505). Drop also reports inside the pre-model (matrix-form) ellipse (see FIG. 2), see steps 507 and 505.
3. STABLE: Used when the coverage area approximation is believed to be correct. If a report is outside the outer box 24 (see FIG. 2), store it, see step 503. Otherwise, drop the report with a random chance (see step 504), for instance with 99% or 99.9% (for instance by generating a random number between 0 and 1, and dropping the report if the number is smaller than 0.999). This will quickly discard most of the incoming reports, but also allow to eventually detect if the coverage area changes.
4. MOVING: More than one (for instance more than a pre-defined number of) potential outlier has occurred, the true location of the coverage area or the coverage area itself is dubious. A similar processing as in the COLLECTING state is performed.
5. GHOST: A coverage area whose reports have all expired and no new reports have been received since. The last known coverage model (e.g. an ellipse or a model that is based on this ellipse) is still kept in the RMDB 15. If any new reports with respect to the coverage area of this base station arrive, reinitialize it and put it to BURN-IN state.

Storage of reports in RDB 13 (see step 509) then triggers updating of the state of the coverage area and adding of the calculation of the coverage area to the RMG queue. Thus any potential change in a coverage area causes it to be put into the RMG queue. The RMG process (see RMG block 14 of FIG.

1) is run for each coverage area found in the RMG queue for generation of a polygon, of coverage models and of pre-models as already described above, so these models are accordingly recalculated. There may be precautions taken to ensure that a coverage area does not appear in the queue multiple times, as it could for instance happen with high-traffic coverage areas.

In order to ensure that the coverage model and the pre-models are robustly adapted when the related coverage area changes, it may be advantageous to have a process that identifies and monitors potentially outdated reports and/or potential outliers and removes them if it is found that the reports are indeed outdated and/or outliers.

To this end, in the exemplary system of FIG. 1, a monitoring process (MON) keeps running (e.g. continuously, periodically or event-based) through the reports stored in RDB 13 and puts reports with too old timestamps (which timestamps are for instance assigned to the report upon reception) into monitoring mode. This is accomplished by creating monitoring boxes for the reports, with an expiry time some time in the future. The associated coverage area is then also put into the RMG queue. Any new report with a position hitting a monitor box will cause the monitor box to be removed and the corresponding report's timestamp to be updated to the current time. The timestamp of a report therefore indicates when was the last time that there was a report from (the vicinity) of the report's position. Furthermore, if any monitor box is detected to be past its expiry time, it is removed together with its associated report, and the associated coverage area is put into the RMG queue. The monitoring process further triggers state transitions of the state diagram, as will be explained with reference to FIG. 4 below.

In the exemplary system of FIG. 1, in addition to the MON process, which puts reports that are suspected to be outdated into monitoring mode, also an outlier detection process is implemented (as part of the RMG process), which may put reports that are suspected to be outliers into monitoring mode. Outlier detection is performed by checking new reports against the old coverage area estimates (as for instance expressed by the pre-models) and by putting suspected (i.e. potential) outliers (for instance positions that have a distance from the pre-model(s) that is above a pre-defined threshold) directly into monitoring with a specific expiry time. Therein, once a report is in monitoring mode, the treatment is the same irrespective of which process (MON or RMG/outlier detection) actually put the report into monitoring mode.

If a coverage area has any reports in monitoring, they are checked first (see step 501 in FIG. 3) without any state-dependent filtering, so the state of the coverage area does not affect monitoring.

When a coverage area has reports in monitoring, the RMG block 13 stores, in addition to the polygon of all reports, also the vertices of a polygon only from non-monitored reports. This way, in a case of potential outliers, the optimal polygons both including and excluding the potential outliers can be maintained. This arrangement may ensure that if some of the monitored vertices are removed, there are vertices in reserve (i.e. vertices in the vicinity of the monitored vertices that are not discarded in screening since the pre-models used in screening are based on the non-monitored polygon) to produce a good coverage model.

In the exemplary system of FIG. 1, single potential outliers are put in monitoring so that they disappear quickly unless they are verified by new reports. In case of multiple potential outliers from different terminals (or, because it cannot be distinguished between terminals directly, simply comparing timestamps and, for example, requiring that the reports are separated by certain delta time), all the vertices of the polygon are put in monitoring and the coverage area is set to MOVING state, so that either the old positions or the new positions are quickly verified and the obsolete ones expire away.

Figure 4:
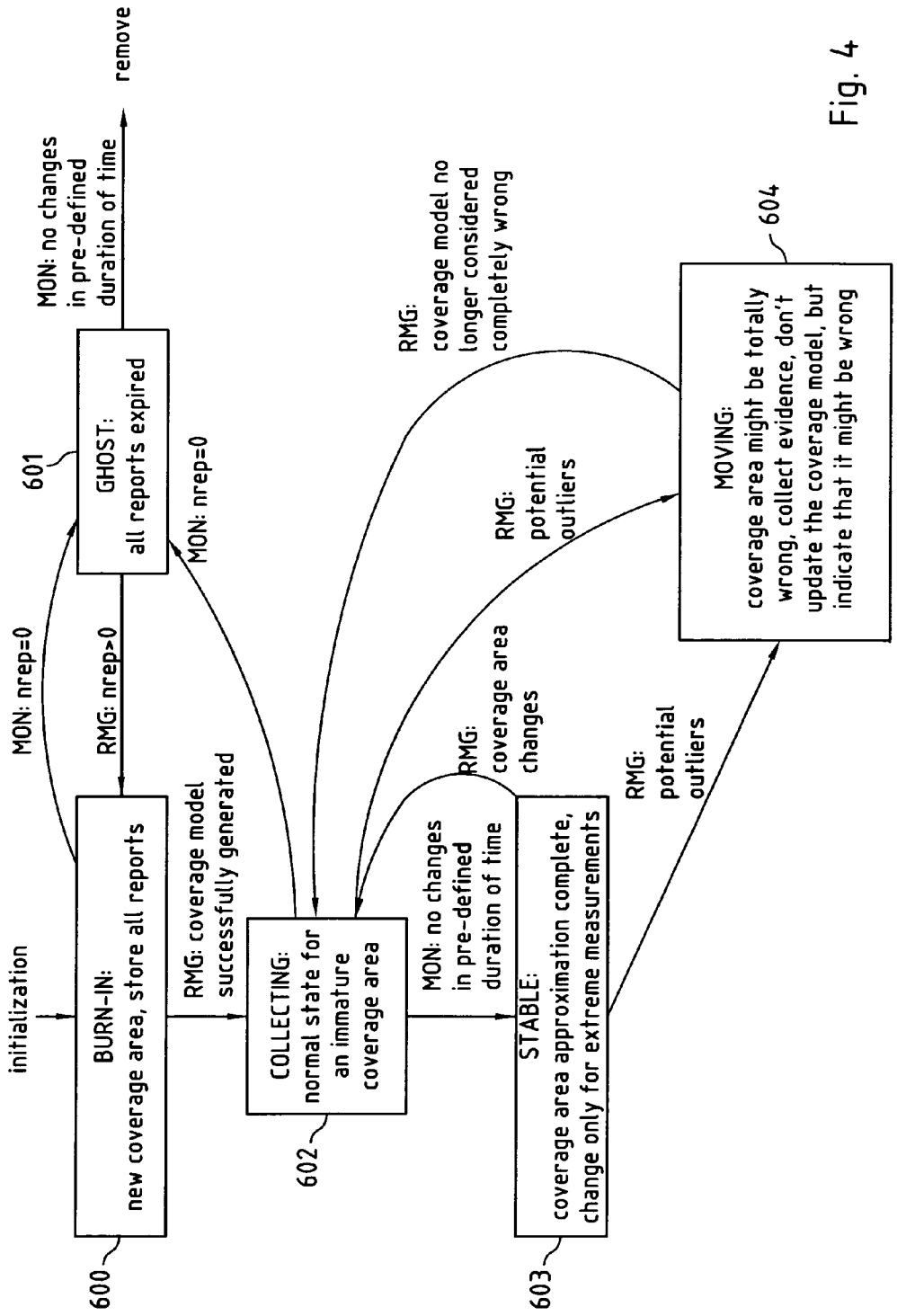
FIG. 4: an exemplary state transition diagram for the state according to the present invention.

For the exemplary system of FIG. 1, FIG. 4 illustrates an exemplary state transition diagram for the states of a state machine associated with a coverage area and the events from the MON and RMG processes that partially trigger the state transitions. Exemplarily an elliptical coverage model is assumed.

Initialization leads to the BURN-IN state 600, i.e. there is a new coverage area to be determined, and all incoming reports are stored. If monitoring reveals that there a no reports for the coverage area, the state is changed to GHOST 601, i.e. there are no reports or all reports expired. If monitoring turns out that no changes occur in a pre-defined duration of time, the coverage area is removed.

If the state is BURN-IN 600, and RMG reports that an elliptical coverage model has been successfully generated, the new state is COLLECTING. If monitoring now turns out that there are no changes within a pre-defined duration of time (and the coverage area is not in the RMG queue), the state is changed to STABLE 603, and is only changed back to COLLECTING 602 in case that the RMG process informs on changes in the coverage area.

Furthermore, if in state STABLE 603, the RMG process informs that there are potential outliers, the state is changed to MOVING 604. The same information causes also a transition from state COLLECTING 602 to state MOVING 604.

In state MOVING 604, the elliptical coverage model is not updated (see step 703 in FIG. 5), but it is indicated that it might be wrong (for instance via the state of the state machine in RMDB 15, see Table 2). From the MOVING state 604, a transition to state COLLECTING 602 is possible if the RMG process reports that the coverage model is no longer considered to be completely wrong (for instance since it passed one or more sanity checks, for instance that the size of the assumed coverage area is again within predefined limits).

Figure 5:
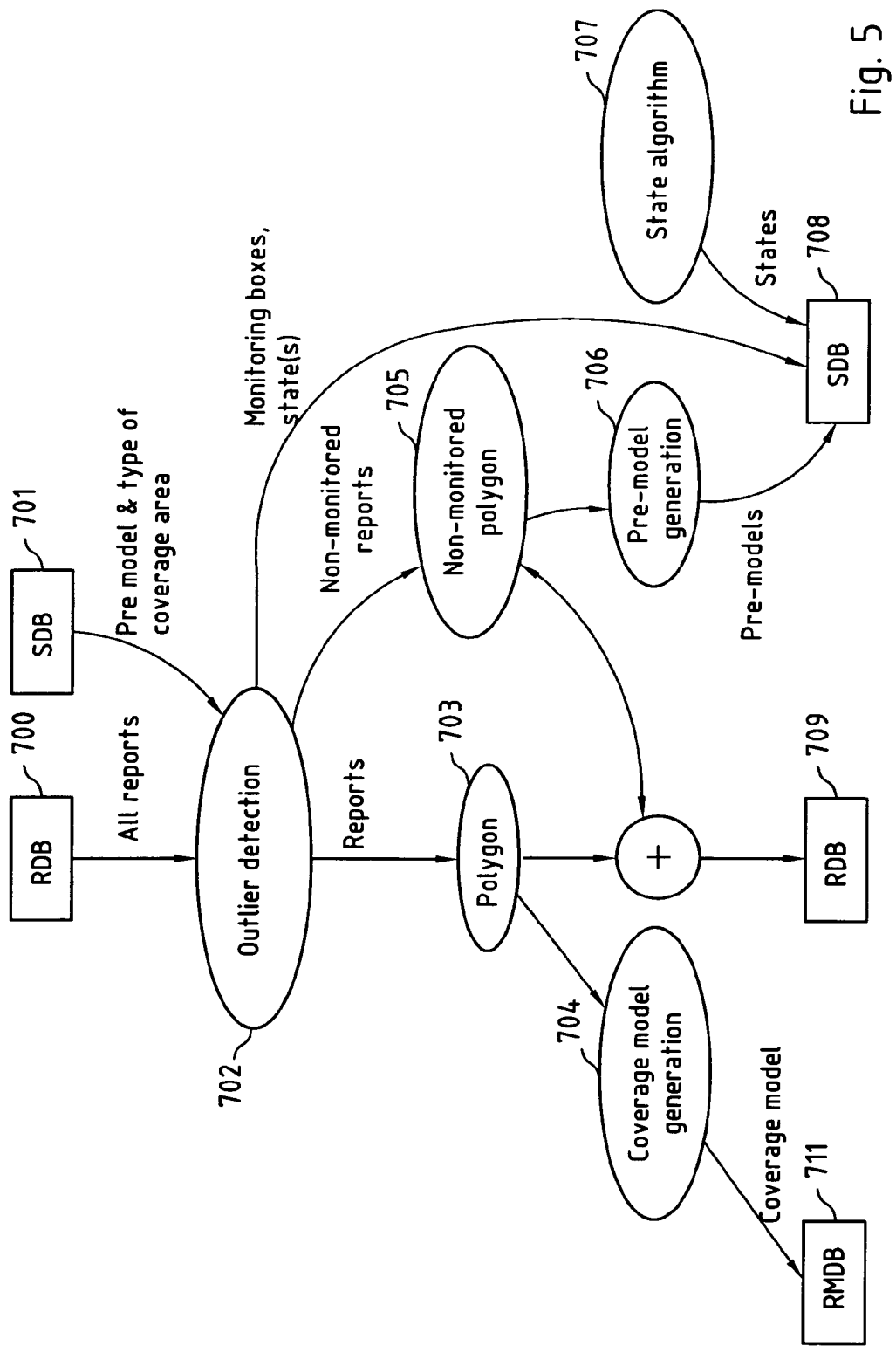
FIG. 5: a schematic block diagram of an exemplary embodiment of polygon generation according to the present invention.

FIG. 5 is a schematic illustration of an exemplary embodiment for the generation of the polygon serving as a representation of the coverage area of a base station and the coverage model and pre-models derived from this polygon.

Block 702 performs outlier detection, based on pre-models and information on the type of coverage area to be determined, for instance the maximum possible radius of the coverage area, as stored in SDB 701 (corresponding to SDB 12 of FIG. 1).

For all reports contained in RDB 700 (corresponding to RDB 13 of FIG. 1), a polygonal representation is determined in block 703. This polygon is then input into block 704, where a coverage model (e.g. an ellipse or a model derived from it) is generated from the polygon, and this coverage model is then stored in RMDB 711 (corresponding to RMDB 15 of FIG. 1).

For all currently non-monitored reports (i.e. for those reports that are neither suspected to be outdated nor suspected to be outliers), a non-monitored polygon is determined in block 705, and this non-monitored polygon serves as a basis for pre-model generation in block 706. The pre-models output by this block (e.g. a matrix-form ellipse, the innerbox and outerbox, see FIG. 2) are then stored in SDB 708 (corresponding to SDB 12 in FIG. 1). SDB 708 further stores monitoring boxes, which are for instance required in the FPFR 11 block's screening in step 701 (see FIG. 5), and state information (e.g. the necessity to transition to MOVING state 604 (see FIG. 4) due to potential outliers), from block 702. SDB 708 further receives state information from state algorithm block 707, which at least partially determines the state transitions illustrated in FIG. 4.

Information on the polygon determined in block 703 and on the non-monitored polygon determined in block 705 is stored back to RDB 709 (corresponding to RDB 13 in FIG. 1).

Figure 6:
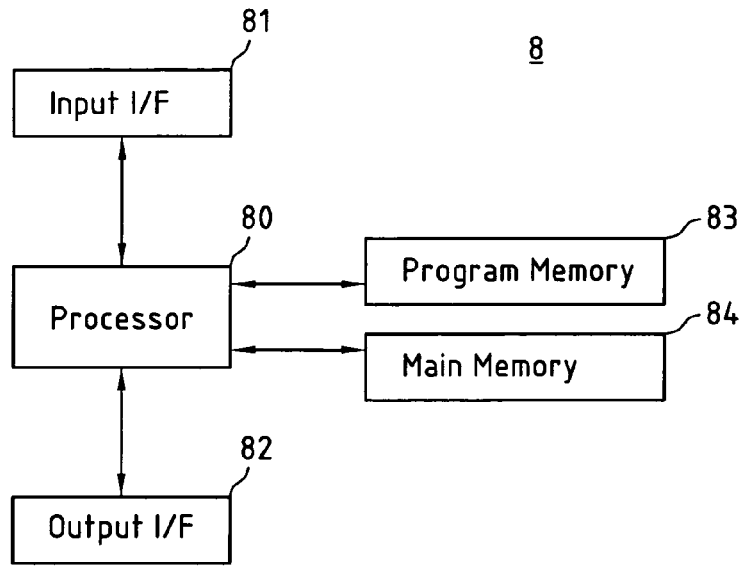
FIG. 6: a schematic block diagram of an exemplary embodiment of an apparatus according to the present invention.

FIG. 6 is a schematic illustration of an exemplary embodiment of an apparatus 8 according to the present invention. The apparatus 8 comprises a processor 80, which communicates with input interface 81, output interface 82, program memory 83 and main memory 84.

Processor 80 is configured to implement at least functionality to determine, as a representation of a set of terminal positions, a polygon that encloses all terminal positions of the set of terminal positions, wherein the terminal positions are positions of one or more terminals within a coverage area of a base station, i.e. at least partial functionality of RMG block 14 (see FIG. 1). To this end, processor 80 may for instance run a computer program with program code for determining, as a representation of a set of terminal positions, a polygon that encloses all terminal positions of the set of terminal positions, wherein the terminal positions are positions of one or more terminals within a coverage area of a base station, wherein this computer program is stored in program memory 83, which may be fixedly attached in apparatus 8 or may be a removable memory. Main memory 84 is used by processor 80 as a working memory, for instance to store intermediate results and variables.

Input interface 81 is configured to allow obtaining data, for instance reports with terminal positions, from another unit, such as for instance RDB 13 of system 1 (see FIG. 1) corresponding to RDB 709 of FIG. 5, but equally well from a unit that implements block 702 of FIG. 5, for instance if the functionality of block 702 is not implemented by apparatus 8.

Similarly, output interface 82 is configured to allow outputting of data, for instance vertices of the polygon determined by processor 80 ("reduced reports" in FIG. 1), for instance to RDB 13 (see FIG. 1) corresponding to RDB 709 in FIG. 5, but equally well to another unit. Output interface 82 may further be configured to output coverage models and optionally base station positions to RMDB 15 (see FIG. 1) corresponding to RMDB 711 (see FIG. 5), in particular if processor 80 implements functionality to derive a coverage model from the polygon, and to output pre-models to SDB 12 (see FIG. 1) corresponding to SDB 708 (see FIG. 5, in particular if processor 80 implements functionality to derive pre-models from the polygon. As indicated above, processor 80 may be further configured to implement further functions of RMG block 14 of the system of FIG. 1, for instance detecting outliers and setting monitoring states as indicated in block 702 of FIG. 5, and then input interface 81 and output interface 82 may be configured to receive and output the information received and outputted by block 702 of FIG. 5.

Furthermore, processor 80 may be configured to derive coverage models (see block 704 of FIG. 5) and/or pre-models (see block 706 of FIG. 5), and then input interface 81 and output interface 82 may be configured to receive and output the information received and outputted by blocks 704 and 706 of FIG. 5, respectively.

Figure 3:
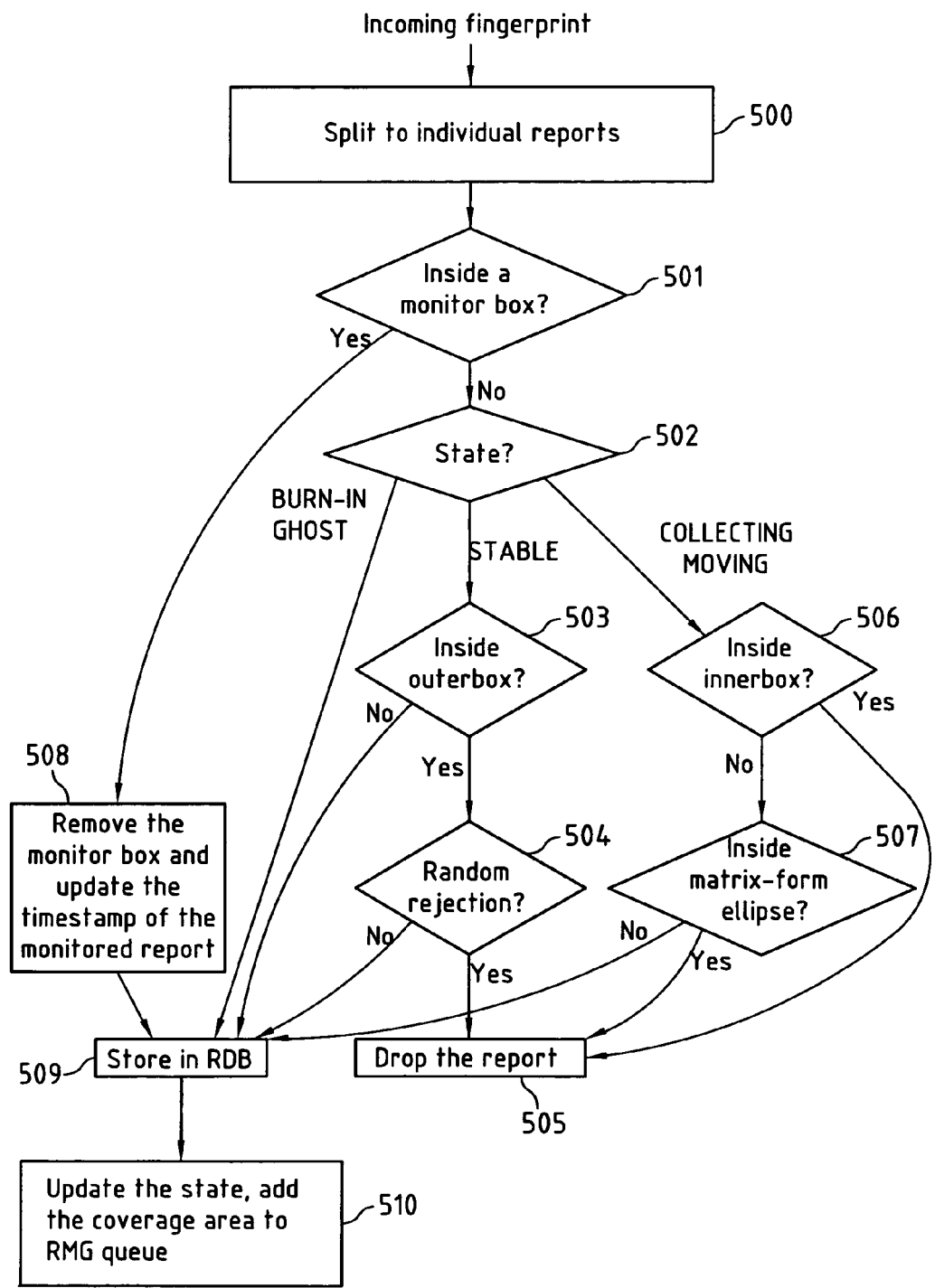
FIG. 3: a flowchart of an exemplary embodiment of a screening process according to the present invention.

Processor 80 may also be further configured to implement some or all of the functionality of FPFR block 11 (see FIG. 1) of system 1 of FIG. 1, as exemplarily illustrated in the flowchart of FIG. 3. Input interface 81 then may further be configured to receive fingerprints from terminals 10 (see FIG. 1) and pre-models from SDB 12, and output interface 82 then may be further configured to output reports with terminal positions to RDB 13.

Apparatus 8 may for instance be entirely implemented as a module that may for instance be integrated into a server. Apparatus 8 may for instance be entirely implemented as a circuit on a semiconductor chip. Apparatus 8 may for instance be entirely implemented on a Digital Signal Processor (DSP), Application Specific Integrated Circuit (ASIC) or Field Programmable Gate Array (FPGA), to name but a few examples.

Figure 7:
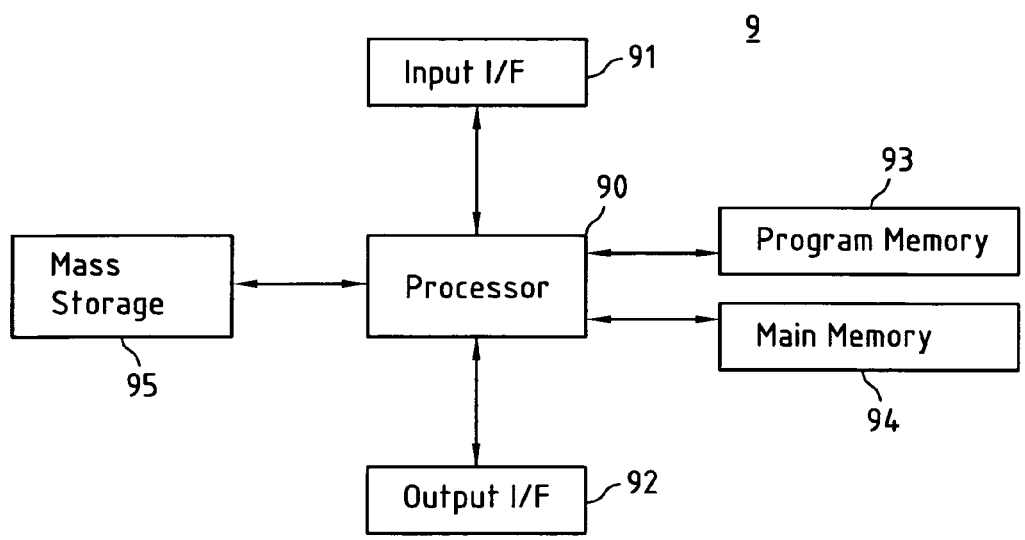
FIG. 7: a schematic block diagram of a further exemplary embodiment of an apparatus according to the present invention.

FIG. 7 is a schematic illustration of a further exemplary embodiment of an apparatus 9 according to the present invention. The apparatus 9 comprises a processor 90, which communicates with input interface 91, output interface 92, program memory 93, main memory 94 and a mass storage 95.

Processor 90 is configured to implement at least functionality to determine, as a representation of a set of terminal positions, a polygon that encloses all terminal positions of the set of terminal positions, wherein the terminal positions are positions of one or more terminals within a coverage area of a base station, i.e. at least partial functionality of RMG block 14 of FIG. 1. To this end, processor 90 may for instance run a computer program with program code for determining, as a representation of a set of terminal positions, a polygon that encloses all terminal positions of the set of terminal positions, wherein the terminal positions are positions of one or more terminals within a coverage area of a base station, wherein this computer program is stored in program memory 93, which may be fixedly attached in apparatus 9 or may be a removable memory. Main memory 94 is used by processor 90 as a working memory, for instance to store intermediate results and variables.

As processor 80 of apparatus 8 (see FIG. 6), processor 90 may also be configured to implement further functions of RMG block 14 of the system of FIG. 1, for instance detecting outliers and setting monitoring states as indicated in block 702 of FIG. 5. Furthermore, processor 80 may be configured to derive coverage models (see block 704 of FIG. 5) and/or pre-models (see block 706 of FIG. 5).

Mass storage 95 may for instance be configured to implement one or more of RDB 13, SDB 12 and RMDB 15 (either as separate data bases or as a common single data base). Depending on the amount of functionality implemented by processor 90 and on the number and choice of databases (RDB, SDB, RMDB) implemented by mass storage 95, it is then readily clear for a person skilled in the art for the transfer of which kind of information input interface 91, output interface 92 and the connection between processor 90 and mass storage 95 have to be configured.

For instance, if processor 90 implements functionality to determine a polygon as a representation of a set of terminal positions, and further functionality to perform outlier detection, to set monitoring states, to derive coverage models and pre-models, to estimate base station positions and to implement the functionality of FPFR block 11 (see FIG. 1) as exemplarily illustrated in FIG. 3, the connection between processor 90 and mass storage 95 may have to be capable of transferring the following (see FIG. 1): (reduced) reports, RDB queries, BS positions, coverage models, pre-models, monitor boxes and states. Furthermore, input interface 91 may then have to be configured to receive fingerprints from data collectors 10 (or from an instance that receives these fingerprints from data collectors 10), and output interface 92 may have to be configured to output coverage models and base station positions to the positioning clients 16, and coverage models to data collectors 10.

Apparatus 9 may for instance be entirely implemented as a module that may for instance be integrated into a server. Apparatus 9 may for instance be entirely implemented as a circuit on a semiconductor chip. Apparatus 9 may for instance be entirely implemented on a Digital Signal Processor (DSP), Application Specific Integrated Circuit (ASIC) or Field Programmable Gate Array (FPGA), to name but a few examples.

Figure 8:
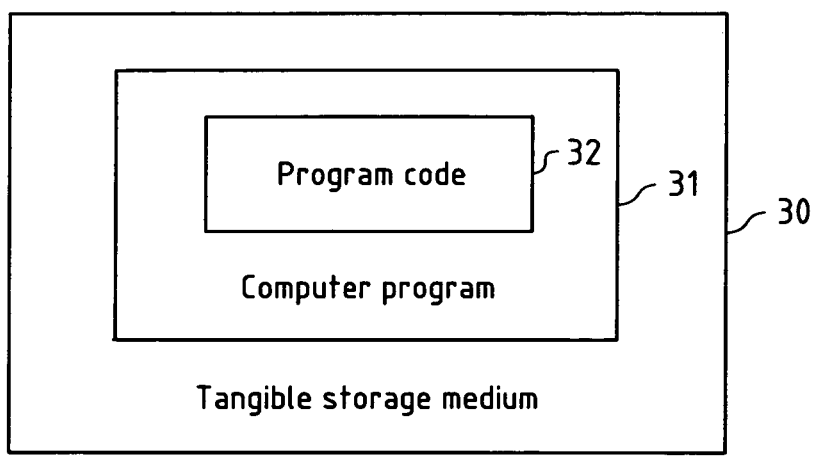
FIG. 8: a schematic illustration of an exemplary embodiment of a tangible storage medium according to the present invention.

FIG. 8 is schematic illustration of an exemplary embodiment of a tangible storage medium 30 according to the present invention. Tangible storage medium 30 may for instance store a computer program 31 with program code 32 for determining, as a representation of a set of terminal positions, a polygon that encloses all terminal positions of the set of terminal positions, wherein the terminal positions are positions of one or more terminals within a coverage area of a base station. Tangible storage medium 30 is a readable medium, for instance a computer-readable or processor-readable medium. Accordingly, the computer program 31 stored on tangible storage medium 30 may be executable by a computer or a processor. Tangible storage medium 30 may for instance be embodied as an electric, magnetic, electro-magnetic, optic or other tangible storage medium, and may either be a removable medium or a medium that is fixedly installed in an apparatus or device, such as for instance apparatus 8 of FIG. 6 or apparatus 9 of FIG. 7.

Figure 9:
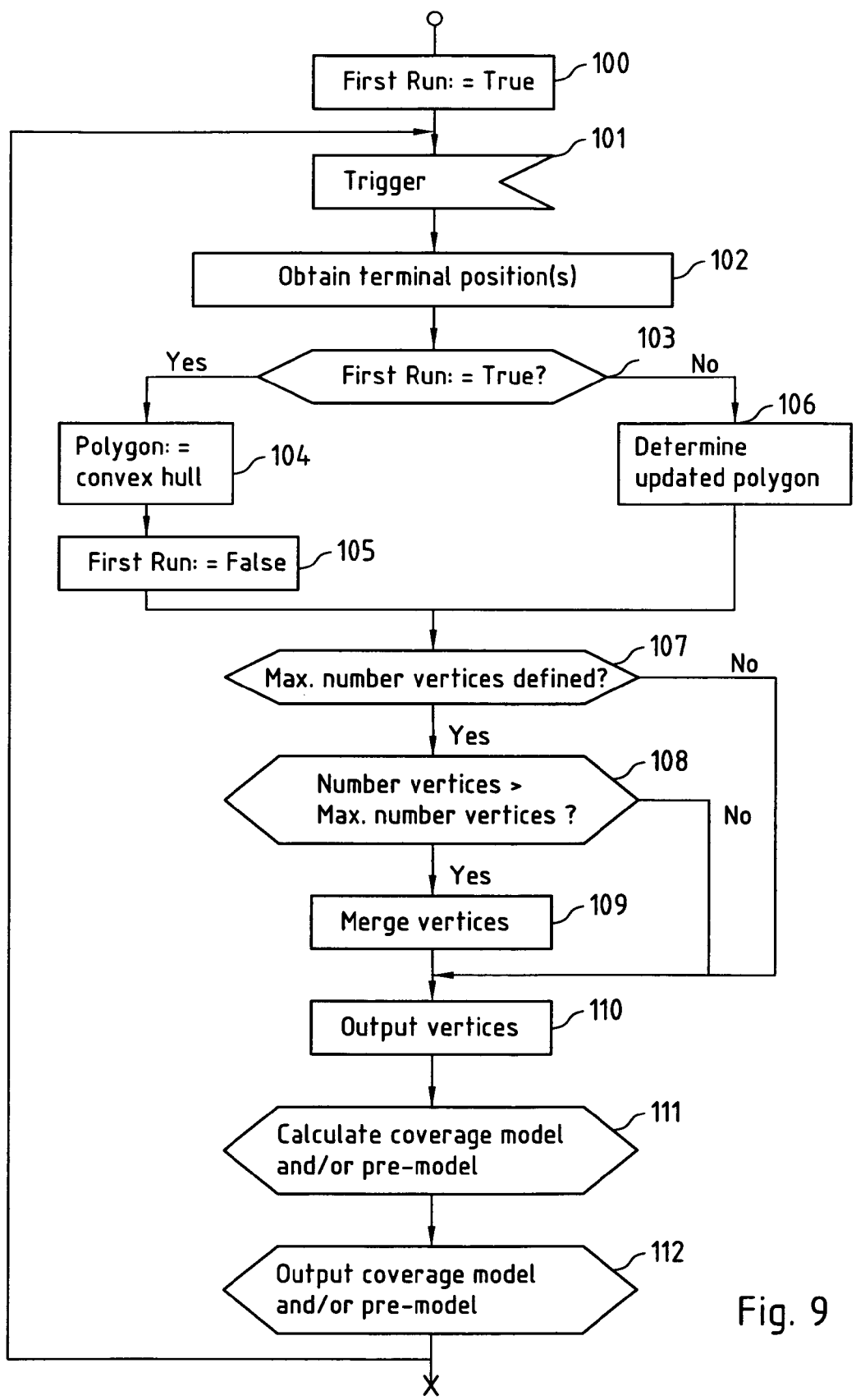
FIG. 9: a flowchart of an exemplary embodiment of a method according to the present invention.

FIG. 9 is a flowchart of an exemplary embodiment of a method according to the present invention. This method may for instance be implemented as a computer program that is stored in program memory 83 of apparatus 8 (see FIG. 6) or in program memory 93 of apparatus 9 (see FIG. 7). Consequently, this method may be executed by processor 80 of apparatus 8 or processor 90 of apparatus 9. Equally well, this flowchart may be implemented as program code 32 of computer program 31 stored on tangible storage medium 30 (see FIG. 8).

In the following description, it is firstly assumed that the polygon is to be determined as a representation of a set of terminal positions. Such a polygon may then for instance be used to derive a coverage model that is to be stored in RMDB 15 of FIG. 1, corresponding to RMDB 711 of FIG. 5.

In a first step 100, a variable FirstRun is set to True.

In a step 101, then a trigger signal is awaited. This trigger signal may for instance be generated each time a coverage area is added to the RMG queue, as illustrated in block 510 of FIG. 3. Therein, it is to be noted that adding a coverage area to the RMG queue may not be performed each time a single report/terminal position is received and stored to the RDB, but only if a pre-defined amount of reports/terminal positions with respect to the coverage area has been received. Further alternatively, even when a coverage model has been added to the RMG queue, the trigger event may only be sent if there is a certain amount of new terminal positions with respect to this coverage area.

If such a trigger event is received, the flowchart proceeds to step 102, where terminal positions are obtained, for instance by obtaining reports that include the terminal positions (and that may comprise further information). Terminal positions may for instance be obtained from RDB 13 (see FIG. 1) corresponding to RDB 700 in FIG. 5, or from block 702 in FIG. 5.

Therein, when the flowchart is executed for the first time (FirstRun=True) (for instance when the state of the coverage area is BURN-IN, see FIGS. 5 and 6), these terminal positions may constitute an initial set of terminals, for which no polygonal representation has been determined before.

Accordingly, if the check on FirstRun in step 103 is positive, step 104 is executed, where an initial polygon is determined as the convex hull for all terminal positions in the set of terminal positions obtained in step 102. An exemplary algorithm for determining a convex polygon for a set of terminal positions is described below in Appendix A.2 with reference to Appendix A.1.

In step 105, the variable FirstRun is then accordingly set to False.

In step 107, it is then checked if a maximum number of vertices has been defined. If this is the case, it is checked if the number of vertices of the initial polygon exceeds this maximum number of vertices. If this is the case, vertices of the polygon are merged to reduce the number of vertices down to the maximum number of vertices. This causes the polygon area to increase, so that the polygon no longer equals the initial polygon (e.g. no longer equals the convex hull for the terminal positions obtained in step 102). An exemplary algorithm for merging vertices of a polygon maintaining convexity is described below in Appendix A.4. It is however to be noted that steps 107-109 are optional.

The flowchart then proceeds to step 110, and outputs the vertices of the polygon, for instance to RDB 13 in FIG. 1 corresponding to RDB 709 in FIG. 5, where they are stored as reduced set of terminal positions/reduced set of reports. If further parameters (e.g. timestamps, RSS, etc.) are associated with the terminal positions in the reports stored in RDB 13/709, these further parameters may also be stored back with their associated vertices/terminal positions to RDB 13/709.

In a step 111, then a coverage model is calculated based on the polygon (see block 704 of FIG. 5), and in step 112, the coverage model is outputted, for instance to RNDB 15 of FIG. 1 corresponding to RNDB 711 of FIG. 5.

As already explained above, the coverage model may for instance be an elliptical coverage model such as the outer ellipse 23 of FIG. 2. An according algorithm for deriving such a minimum ellipse from a polygon is exemplarily given in Appendix A.5.

Steps 111-112 are however to be considered optional. These steps are for instance not performed by apparatus 8 of FIG. 6 or apparatus 9 of FIG. 7 if the respective apparatus is only configured to determine the vertices of the polygon, but outputs the vertices to a further unit for derivation of the coverage models and/or for the estimation of the base station positions based on these vertices.

In steps 111 and 112, furthermore the base station position may be estimated and outputted. For this estimation, for instance TA measurements reported from GSM (2G) terminals and associated with the vertices of said polygon may be used. An exemplary embodiment of an algorithm for estimating the position of a base station is presented in Appendix A.7 below.

The flowchart then returns to step 101 and awaits a further trigger event that causes obtaining of terminal positions.

If such an event is received, terminal positions are obtained in step 102 as already explained above. However, since this is no longer the initial run of the flowchart (FirstRun=False), the terminal positions obtained are no longer an initial set of terminal positions, but contain the vertices of the initial (or "old") polygon (as outputted in step 110) and additionally new terminal positions. This may for instance frequently occur in the state COLLECTING (see FIG. 3), but of course also in other states.

There exist several ways to differentiate between the terminal positions that are actually vertices of an old polygon and the newly reported terminal positions. One exemplary way of differentiation is to require that the vertices of the old polygon are always the first terminal positions in RDB 13, and that new terminal positions are appended thereafter. It is then only necessary to know how many vertices the old polygon comprised to differentiate, in the set of obtained terminal positions, between the terminal positions that are actually vertices of the old polygon and the new reported terminal positions. Alternatively, each report in RDB 13 may have a specific marker that indicates if it contains a new terminal position or a vertex of an already determined polygon. Similarly, timestamps may for instance be used to differentiate new terminal positions from old terminal positions.

In a step 106, an updated polygon is then determined based on the set of terminal positions obtained in step 102. Two exemplary algorithms for updating an old (convex) polygon with new terminal positions while maintaining the convexity of the polygon are described in Appendix A.3.

The updated polygon determined in step 106 then is subject to the same processing steps 107-112 as the initially determined polygon.

It should be noted that the differentiation between the first run and subsequent runs, as exemplarily presented in the flowchart of FIG. 9 in step 103, is not mandatory. For instance, as an alternative, step 100 of the flowchart of FIG. 9 could be cancelled, and steps 103-106 could be replaced by a step that determines a convex polygon for all terminal positions obtained in step 102, for instance based on the algorithm described in Appendix A.2.

The above description of the flowchart of FIG. 9 assumed that the polygon is determined for a set of terminal positions, and that this polygon then serves as a basis for derivation of a coverage model that is to be stored in RMDB 15 (see FIG. 1) to be provided to the positioning clients 16.

As is visible from FIG. 5, for the generation of the pre-models that are to be stored in SDB 708 to serve for filtering incoming fingerprints in FPFR block 11 (see FIG. 1), a non-monitored polygon is determined based on a set of non-monitored terminal positions.

This non-monitored polygon may be generated following the steps of flowchart 10 described above, wherein in step 102, only non-monitored terminal positions are obtained. This may be accomplished by obtaining only the non-monitored terminal positions from another unit, or by obtaining both monitored and non-monitored terminal positions from another unit and separating the non-monitored terminal positions from the monitored ones. For instance, both monitored and non-monitored terminal positions may be read from RDB 13, and based on the fact whether monitoring boxes and/or monitoring expiry timestamps are associated with terminal positions, it is determined which terminal positions are monitored and which are not. Furthermore, in step 111, the pre-model is generated based on the polygon, and in step 112, the pre-model is output, for instance to SDB 708 of FIG. 5.

As also already explained above, an example of such a pre-model is the inner box 25 of FIG. 2. Further non-limiting examples of a pre-model are the outer box 24 and the ellipse 23 of FIG. 2.

It is to be noted that the determining of a polygon based on a set of terminal positions including all reports (to obtain a coverage model) and based on a set of terminal positions without monitored reports (to obtain pre-models), which has been described separately above, may equally performed jointly each time a trigger event is received in step 101.

The following appendices describe exemplary algorithmic details of the present invention and are to be understood as part of the disclosure.

Appendix A.1: Testing if a Point is in a Convex Polygon

Model a coverage area as a convex polygon with vertices $p_1, \ldots, p_n$, where vertices are in counterclockwise order. For simplicity we use cyclic indexing of vertices $p_i = p_{i+kn}$, where k is a non-negative integer to represent cyclicity.

$$P = \{x | \forall i; 1 \le i \le n : (x - p_{i-1}) \times (p_i - p_{i-1}) \le 0\},$$

where × is the "two-dimensional cross-product"

$$x \times y = x_1 y_2 - x_2 y_1,$$

and $x=(x_1, x_2)$ and $y=(y_1, y_2)$.

The two-dimensional cross-product may be used to see if a point q is on left or right side of a line from $p_i$ to $p_j$. If $(q-p_i) \times (p_i-p_j)=a$ and a<0 then q is on the left side. If a>0 then q is on the right side and if a=0 then q is on the line.

Testing if a point q is inside a convex polygon can be done in log(n) time using binary search for testing in which sector of polygon the point q lies.

Figure 10:
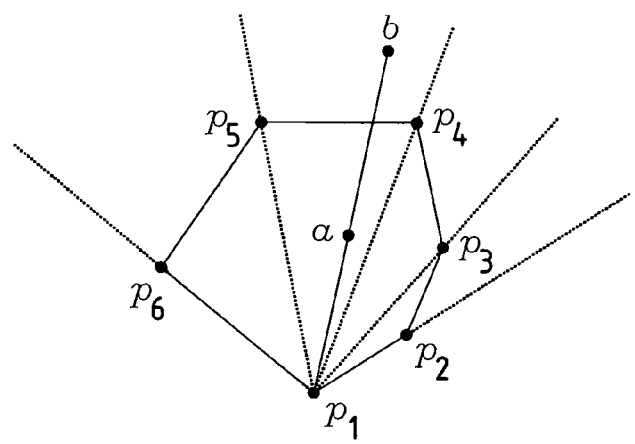
FIG. 10: a schematic illustration of a point lying within a polygon and a further point lying outside a polygon.
Figure 11A:
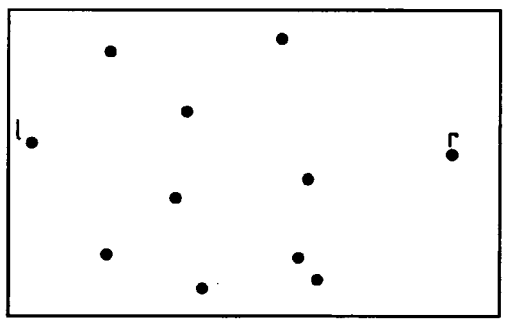
FIGS. 11a-11d: schematic illustrations of an exemplary algorithm for generating a convex polygon for a set of points according to the present invention.
Figure 11B:
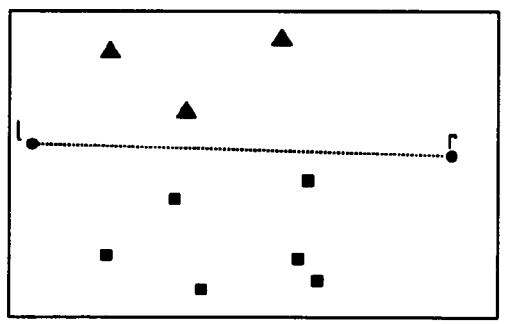
Figure 11C:
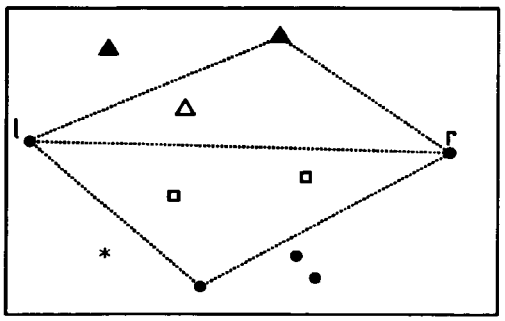
Figure 11D:
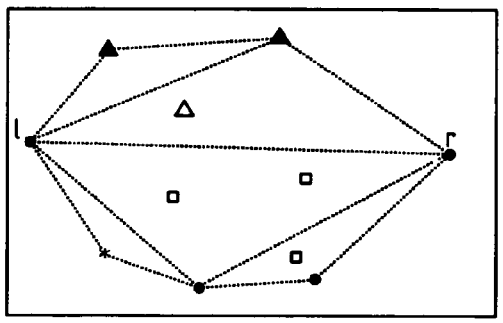
Figure 12A:
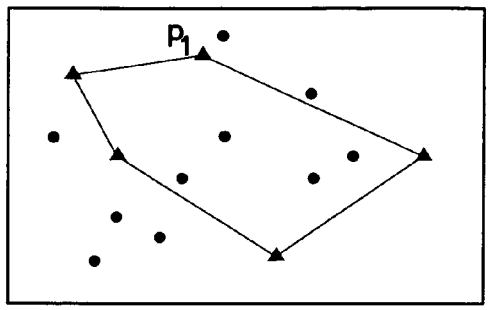
FIGS. 12a-12d: schematic illustrations of an exemplary algorithm for updating a convex polygon with new points according to the present invention.
Figure 12B:
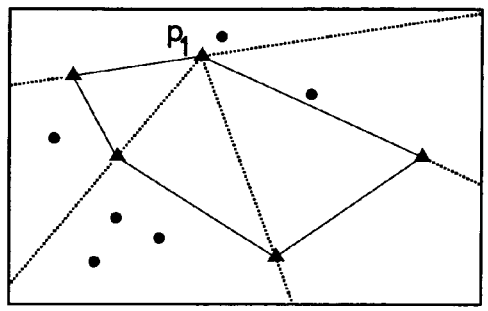
Figure 12C:
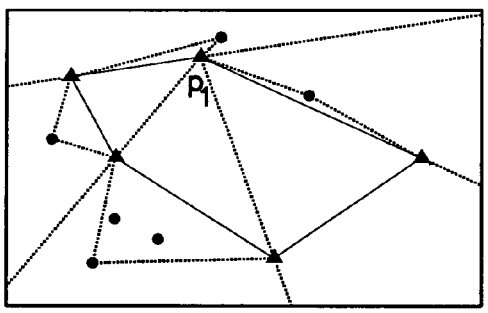
Figure 12D:
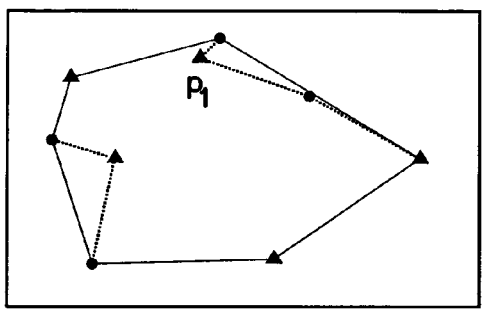

This is schematically illustrated in FIG. 10, wherein point (a) is inside the convex polygon, and point (b) is outside. The polygon is defined by its n=6 vertices $p_1, \ldots, p_6$. An according algorithm is given below:

```
2D cross product
result := x₁y₂ - x₂y₁
Is q inside convex polygon p₁,...pₙ,
with pₙ₊₁= p₁
lo := 1
hi := n + 1
i := ⌊(lo+hi)/2⌋
Do
        side := (p₁ - q) × (pᵢ-p₁)
        if side < 0
                hi := I
        Else
                lo := i
        End
        i := ⌊(lo+hi)/2⌋
until hi-lo = 1
side := (pₗₒ - q) × (pₕᵢ - pₗₒ)
if side < 0 return false
return true
```

Appendix A.2: Quickhull Algorithm for Generating a Convex Hull

The following algorithm, denoted as "quickhull" algorithm, may be used to find the convex hull for a set of points. The algorithm steps are illustrated in FIGS. 11a-11d.

1. Find the leftmost (l) and rightmost (r) points (see FIG. 11a)
2. Divide points into two sets by base segment drawn between l and r (see FIG. 11b)
3. For each set find the point furthest from the base segment. Form a triangle from base segment and the furthest point. Discard points inside the triangle. Use sides of triangles as new base segments and divide the remaining points into sets based on the respectively nearest base segments (see FIG. 11c).
4. Repeat step 3 recursively until all the points are marked as furthest, these points form the convex hull (see FIG. 11d).

Appendix A.3: Updating a Convex Polygon (e.g. a Convex Hull) with New Positions while Maintaining the Convexity The following algorithm may equally well be replaced with the quickhull algorithm (see Appendix A.2), using the vertices of the old polygon and the new terminal positions as input.

The algorithm steps of the actual updating algorithm are illustrated in FIGS. 12a-12d.

1. Remove points that are inside old polygon (for instance checked by using the algorithm of Appendix A.1, see FIG. 12a)
2. Divide new points into sectors defined by $\overline{p_i p_1 p_{i+1}}$, i= 2, . . . , n−1 (assuming a counterclockwise increasing numbering of the vertices). Divide points not in any of these sectors in two sets of points by a line $\overline{p_1 p_2}$, wherein the obtained set of points on the right of the line $\overline{p_1 p_2}$ (when the direction of the line $\overline{p_1 p_2}$ is from $p_1$ to $p_2$) also includes points $p_1$ and $p_2$, and the obtained set of points on the left of the line $\overline{p_1p_2}$ also includes points $p_1$ and $p_{n-1}$ (see FIG. 12b).
3. Use step 3 of the quickhull algorithm (see Appendix A.2) for each sector and on the two obtained sets of points of step 2 (see FIG. 12c)
4. Catenate convex hulls of the sectors, go the outer border through counterclockwise and remove all turns to the right (see FIG. 12d). This is to be understood as follows: If, when going from $p_i$ to $p_{i+2}$ through $p_{i+1}$, one must turn right at $p_{i+1}$ (when turning through the minimum angle), then $p_{i+1}$ shall be removed.

Appendix A.4: Limiting Amount of Vertices in Polygon

Figure 13:
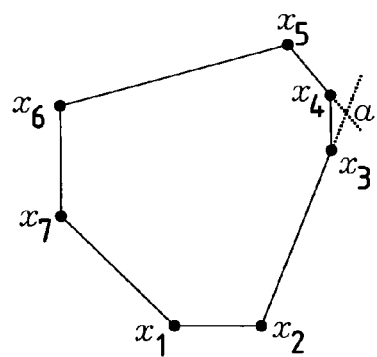
FIG. 13: a schematic illustration of an exemplary algorithm for reducing the number of vertices of a polygon according to the present invention.

If the number of vertices gets too high, two adjacent vertices can be merged so that the new polygon covers the whole old polygon and the increase of area is minimal. If vertices $x_i$ and $x_{i+1}$ are merged then the new vertex a will be in the point where lines defined by pairs $x_i$, $x_{i-1}$ and $x_{i+1}$, $x_{i+2}$ intersect, as exemplarily illustrated in FIG. 13 for a merging of points $x_3$ and $x_4$ into point a.

Intersection point a can be solved from the following two equations $$x_i + b(x_i - x_{i-1}) = a$$

$$x_{i+1} + c(x_{i+1} - x_{i+2}) = a$$

where b and c are real numbers and the other variables are two-dimensional real numbers.

The increase of area of the polygon if points $x_i$ and $x_{i+1}$ are merged is $$-\frac{(x_i - a) \times (x_{i+1} - a)}{2}$$

Appendix A.5: Minimum Ellipse around a Polygon

An iterative method parameterizes the ellipse as a weighted sum of the points, with weights $\lambda_i \geq 0$, $\Sigma \lambda_i = 1$, as follows:

$$c = \sum_{i=1}^{n} \lambda_i p_i$$

$$A^{-1} = m\left(\sum_{i=1}^{n} \lambda_i (p_i - c)(p_i - c)^T\right).$$

where m is the dimension of the points (in our case m=2). One recursive method for finding the weights $\lambda_1, \ldots, \lambda_n$ is:
1. initialise $\lambda_i = 1/n$, i=1 . . . n, for example
2. compute the new ellipse estimate c and A
3. compute the elliptic distance $r_i = (p_i - c)^T A(p_i - c)$ for each point
4. pick the index j with the largest $r_j$
5. set the step size $$s = \frac{1 - 1/r_j}{m + 1}$$

6. modify the weights to $\lambda_j = (1-s)\lambda_j + s$ and $\lambda_i = (1-s)\lambda_i$ for the rest $i \neq j$
7. repeat from 2. until $|s| < 10^{-3}$ or maximum iterations are exceeded (or another convergence criterion)

Note: steps 4-6 could be improved for better convergence; currently just one element is improved at a time.

The resulting ellipse is in the form $(x-c)^T A(x-c) \leq 1$ where $$A = \begin{bmatrix} a & b \\ b & d \end{bmatrix},$$

a>0, d>0, c=($c_1$, $c_2$) and thus only 5 floats have to be stored, $c_1$, $c_2$, a, b, d.

Note: In step 1, if fixed initial guess is used instead of exploiting for instance the old ellipse then the same points always produce the same result, and it is avoided to have to update the ellipse into the database just because a different initial point produced numerically different results.

Appendix A.6: Coordinate and Ellipse Conversions

Straight lines on Earth are defined as those following the great circles (i.e. the circles on the surface of the earth dividing the Earth into two equal hemisphere so that the centre of the Earth lies on the plane defined by the great circles), and there is a difference between them and the straight lines in geodetic coordinates. These are luckily negligible for small coverage areas. At latitudes less than 80°, this error is less than 3 m for coverage areas with 5 km diameter, and less than 150 m for coverage area with 35 km diameter.

At latitude $\phi$, the length of one meter in East/North directions in degrees is:

$$s_E(\phi) = \frac{180}{\pi} \frac{\sqrt{1 - e^2\sin(\phi)^2}}{a\cos(\phi)} °/m$$

$$s_N(\phi) = \frac{180}{\pi} \frac{(1 - e^2\sin(\phi)^2)^{\frac{3}{2}}}{a(1 - e^2)} °/m,$$

where a and e are the WGS-84 semi-major axis and eccentricity of Earth.

Then a local conversion from 2D geodetic coordinates ($\phi$, $\lambda$) to Cartesian East-North coordinates (x, y) with origin at ($\phi_0$, $\lambda_0$) is $$\begin{bmatrix} x \\ y \end{bmatrix} = M \begin{bmatrix} \phi - \phi_0 \\ \lambda - \lambda_0 \end{bmatrix}$$

where $$M = \begin{bmatrix} 0 & s_E^{-1}(\phi_0) \\ s_N^{-1}(\phi_0) & 0 \end{bmatrix}, \quad (1)$$

Conversion between Axis/Angle-form and Matrix-form Ellipses

The centers of the axis/angle-form and matrix-form ellipses are the same. Given an axis/angle-form ellipse with semiaxes with radii $r_1$ and $r_2$ (in meters), and clock-wise angle $\theta$ between first semiaxis and North, the corresponding matrix form is $$A = M^T \begin{bmatrix} \sin(\theta) & \cos(\theta) \\ \cos(\theta) & -\sin(\theta) \end{bmatrix} \begin{bmatrix} r_1^{-2} & 0 \\ 0 & r_2^{-2} \end{bmatrix} \begin{bmatrix} \sin(\theta) & \cos(\theta) \\ \cos(\theta) & -\sin(\theta) \end{bmatrix} M. \quad (2)$$

Conversely, given the matrix A, the corresponding semiaxis lengths and rotation angle of the axis/angle-form ellipse are $r_1 = \sqrt{\text{first eigenvalue of } MA^{-1}M^T}$ $r_2 = \sqrt{\text{second eigenvalue of } MA^{-1}M^T}$ $\theta = a\tan2(v_1, v_2)$ where v is the eigenvector of $M A^{-1} M^T$ corresponding to its first eigenvalue, and the a tan2-function denotes the arc tangent taking the quadrants into account.

Appendix A.7: Base Station Position Estimation

Figure 14:
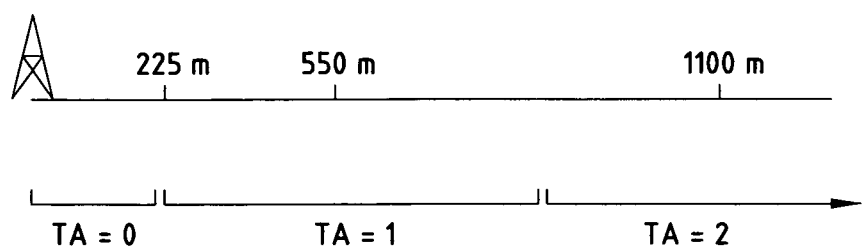
FIG. 14: a schematic illustration of a timing advance parameter.

The base station position may for instance be estimated in the RMG block 14 (see FIG. 1) from the terminal positions and associated distances to the base station, such as for instance TA measurements. The resolution of 550 m in TA range measurement may place severe penalty on the accuracy, which may be of the order of 50-100 m even in ideal cases. The relationship between distance and TA measurement is illustrated in FIG. 14.

Let the initial base station position estimate be $x_0$ and its covariance matrix $C_0$. These can be obtained form a previous calculation. Alternatively, the initial position $x_0$ may for example be an average of the terminal positions. The elements of $C_0$ can then be set to some suitable large value.

The base station position as well as the terminal positions are exemplarily assumed to be in geodetic WGS-84 coordinates, and they then have to be converted to Cartesian coordinates for distance computations. This is done by multiplying with matrix M (see equation (1) in appendix A.6 above) at proper places.

The resulting Gauss-Newton iteration for computing the base station position x and its covariance C from n measurements (with n, in this context, denoting the vertices of the polygon stored in RDB 13 of FIG. 1) is:

1. $x \leftarrow x_0$

2. $R = \begin{bmatrix} \sigma_1^2 & & & \\ & \ddots & & \\ & & \sigma_n^2 & \\ & & & C_0 \end{bmatrix}$, where $\sigma_i^2$ is the variance of the ith TA measurement $y_i$.

3. $d_i = M(p_i - x)$,
where $d_i$ is the unit vector from the base station position estimate x to the i-th terminal position $p_i$.

4. $f = \begin{bmatrix} y_1 - \|d_1\| \\ \vdots \\ y_n - \|d_n\| \\ x - x_0 \end{bmatrix}$ (the innovation vector, with $y_i$ denoting the i-th TA measurement)

$J = \begin{bmatrix} \frac{d_1^T}{\|d_1^T\|} M^T \\ \vdots \\ \frac{d_n^T}{\|d_n^T\|} M^T \\ I \end{bmatrix}$ (the Jacobian matrix of partial derivatives)

5. $\Delta x \leftarrow -(J^T R^{-1} J)^{-1} J^T R^{-1} f$. Note that the matrix $(J^T R^{-1} J)$ might be numerically singular because of e.g. collinear geometry of the reports. In this case, return with a failure.

6. $x \leftarrow x + \Delta x$

7. Repeat from 3. until convergence (e.g. $\|\Delta x\|$ below a pre-determined threshold) or until a (pre-defined) maximum number of iterations has been reached.

8. Finally, check the magnitude of the residual $f^T R^{-1} f$ against some critical value $\alpha$ of the inverse of the cumulative $\chi^2$-distribution with n degrees of freedom. If the residual is small enough, set the covariance of the base station position to $C \leftarrow (J^T R^{-1} J)^{-1}$ and return x and C.

It is readily clear for a person skilled in the art that the logical blocks in the schematic block diagrams as well as the flowchart and algorithm steps presented in the above description and its appendices may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

The invention claimed is:

1. A method, wherein said method is performed by an apparatus, said method comprising:
   determining, as a representation of a set of terminal positions, a polygon that encloses all terminal positions of said set of terminal positions, wherein said terminal positions are positions of one or more terminals within a coverage area of a communication node, and wherein said polygon represents said coverage area of said communication node.

2. The method according to claim 1, wherein said polygon represents a convex hull for said set of terminal positions or is derived from said convex hull by merging at least two adjacent vertices of said convex hull.

3. The method according to claim 1, wherein said set of terminal positions comprises an old set of terminal positions and at least one new terminal position, and wherein said polygon is determined under consideration of an old polygon, which encloses all terminal positions of said old set of terminal positions, and said at least one new terminal position.

4. The method according to claim 1, further comprising:
   deriving a model for said coverage area of said communication node from said polygon, wherein said model is to be provided to at least one terminal to allow said terminal to perform positioning based on said model.

5. The method according to claim 1, further comprising: deriving a model for said coverage area of said communication node from said polygon, wherein said model is to be provided to at least one unit that is configured to receive terminal positions reported by one or more terminals and to filter said terminal positions based on said model to at least temporarily reduce an amount of said received terminal positions, and wherein said set of terminal positions only contains such filtered terminal positions.

6. The method according to claim 1, further comprising at least one of:
adjusting the number of vertices of said polygon to control a resolution of said representation of said set of terminal positions and/or a storage space required for storing the vertices of said polygon, and estimating a position of said communication node based on information associated with only said vertices of said polygon.

7. A non-transitory readable medium having a program comprising program code for performing the method according to claim 1, when said program is executed on a processor.

8. An apparatus comprising:
a processor, and
a memory, said memory storing a program comprising program code, said memory and said program configured to, with said processor, cause said apparatus to perform determining, as a representation of a set of terminal positions, a polygon that encloses all terminal positions of said set of terminal positions, wherein said terminal positions are positions of one or more terminals within a coverage area of a communication node, and wherein said polygon represents said coverage area of said communication node.

9. The apparatus according to claim 8, wherein said polygon represents a convex hull for said set of terminal positions or is derived from said convex hull by merging at least two adjacent vertices of said convex hull.

10. The apparatus according to claim 8, wherein said set of terminal positions comprises an old set of terminal positions and at least one new terminal position.

11. The apparatus according to claim 10, wherein said polygon is determined under consideration of an old polygon, which encloses all terminal positions of said old set of terminal positions, and said at least one new terminal position.

12. The apparatus according to claim 11, wherein said old polygon represents a convex hull for said old set of terminal positions or is derived from said convex hull by merging at least two adjacent vertices of said convex hull.

13. The apparatus according to claim 11, wherein said polygon is determined as the convex hull of a set of positions that comprises the vertices of said old polygon and said at least one new terminal position, or is derived from said convex hull by merging at least two adjacent vertices of said convex hull.

14. The apparatus according to claim 8, wherein said memory and said program are further configured to, with said processor, cause said apparatus to perform deriving a model for said coverage area of said communication node from said polygon, wherein said model is to be provided to at least one terminal to allow said terminal to perform positioning based on said model.

15. The apparatus according to claim 8, wherein said polygon is a model for said coverage area of said communication node and is to be provided to at least one terminal to allow said terminal to perform positioning based on said model.

16. The apparatus according to claim 8, wherein said memory and said program are further configured to, with said processor, cause said apparatus to perform deriving a model for said coverage area of said communication node from said polygon, wherein said model is to be provided to at least one unit that is configured to receive terminal positions reported by one or more terminals and to filter said terminal positions based on said model to at least temporarily reduce an amount of said received terminal positions, and wherein said set of terminal positions only contains such filtered terminal positions.

17. The apparatus according to claim 8, wherein said set of terminal positions is obtained from a superset of terminal positions by exclusion of one or more monitored terminal positions, wherein said monitored terminal positions are terminal positions that are considered to be potentially outdated and/or potential outliers with respect to said coverage area.

18. The apparatus according to claim 8, wherein said memory and said program are further configured to, with said processor, cause said apparatus to perform at least one of adjusting the number of vertices of said polygon to control a resolution of said representation of said set of terminal positions and/or a storage space required for storing the vertices of said polygon, and estimating a position of said communication node based on information associated with only said vertices of said polygon.

19. The apparatus according to claim 8, wherein said apparatus is at least one of a server, a module, an apparatus embodied in a chip and an apparatus that further comprises at least one of a memory, IP connectivity and a user interface.

* * * * *